US011623421B2

(12) United States Patent
Conti et al.

(10) Patent No.: US 11,623,421 B2
(45) Date of Patent: Apr. 11, 2023

(54) METHOD AND PLANT FOR HANDLING A GREEN TYRE FOR BICYCLE

(71) Applicant: Pirelli Tyre S.p.A., Milan (IT)

(72) Inventors: Davide Lupo Conti, Milan (IT); Bruno Lodi, Santo Andre (BR); Gian Luigi Bosio, Settimo Torinese (IT)

(73) Assignee: PIRELLI TYRE S.p.A., Milan (IT)

( * ) Notice: Subject to any disclaimer, the term of this patent is extended or adjusted under 35 U.S.C. 154(b) by 178 days.

(21) Appl. No.: 16/472,755

(22) PCT Filed: Nov. 29, 2017

(86) PCT No.: PCT/IB2017/057478
§ 371 (c)(1),
(2) Date: Jun. 21, 2019

(87) PCT Pub. No.: WO2018/122643
PCT Pub. Date: Jul. 5, 2018

(65) Prior Publication Data
US 2021/0129470 A1    May 6, 2021

(30) Foreign Application Priority Data
Dec. 28, 2016  (IT) .................. 102016000131404

(51) Int. Cl.
*B29D 30/00* (2006.01)
*B29D 30/06* (2006.01)

(52) U.S. Cl.
CPC ..... *B29D 30/0016* (2013.01); *B29D 30/0603* (2013.01); *B29D 2030/0022* (2013.01)

(58) Field of Classification Search
CPC ............ B29D 30/0016; B29D 30/0603; B29D 2030/0022
See application file for complete search history.

(56) References Cited

U.S. PATENT DOCUMENTS 3,396,221 A * 8/1968 Musch ............... B29D 30/0645
264/315
3,824,048 A   7/1974 Getz
(Continued)

FOREIGN PATENT DOCUMENTS

CN  2 163 044 Y  4/1994
EP  1 954 478    4/2009
(Continued)

OTHER PUBLICATIONS

International Search Report form the European Patent Office in corresponding International Application No. PCT/IB2017/057478 dated Apr. 17, 2018.

(Continued)

*Primary Examiner* — Niki Bakhtiari
*Assistant Examiner* — John J DeRusso
(74) *Attorney, Agent, or Firm* — Finnegan, Henderson, Farabow, Garrett & Dunner, L.L.P.

(57) ABSTRACT

A green tyre (2) for bicycles is built, comprising at least one carcass ply (4) having axially opposite end flaps (4a) engaged with respective bead cores (5) and a tread band (6) applied in a radially outer position around the at least one carcass ply (4). The built tyre (2) removed from the building drum, is profiled so as to translate the tread band (6) in a radially outer direction with respect to the bead cores (5), so as to impart a cross-sectional convex profile to the tyre (2) in a radially outer direction. The profiled tyre is engaged by means of a transfer member (31) comprising a gripping device (30) which retains it at the radially outer surface (2b) so as to maintain the cross-sectional convex profile in a radially outer direction.

22 Claims, 13 Drawing Sheets

(56) References Cited

U.S. PATENT DOCUMENTS

| | | | | |
|---|---|---|---|---|
| 4,447,385 | A | * | 5/1984 | Blosser .............. B29D 30/0603 |
| | | | | 264/315 |
| 4,474,399 | A | * | 10/1984 | Lauber ............... B29D 30/0016 |
| | | | | 294/201 |
| 4,608,219 | A | | 8/1986 | Singh et al. |
| 4,634,489 | A | | 1/1987 | Dupommier |
| 4,681,521 | A | * | 7/1987 | Grotkasten ........ B29D 30/0603 |
| | | | | 294/119.3 |
| 5,266,147 | A | | 11/1993 | Lundeen |
| 2004/0239134 | A1 | * | 12/2004 | Fukazawa .......... B29D 30/0016 |
| | | | | 294/119.2 |

FOREIGN PATENT DOCUMENTS

| | | |
|---|---|---|
| EP | 2 708 350 A1 | 3/2014 |
| JP | S 56 142050 A | 11/1981 |
| WO | WO 2016/167644 A1 | 10/2016 |

OTHER PUBLICATIONS

Written Opinion of the International Searching Authority from the European Patent Office in corresponding International Application No. PCT/IB2017/057478 dated Apr. 17, 2018.

* cited by examiner

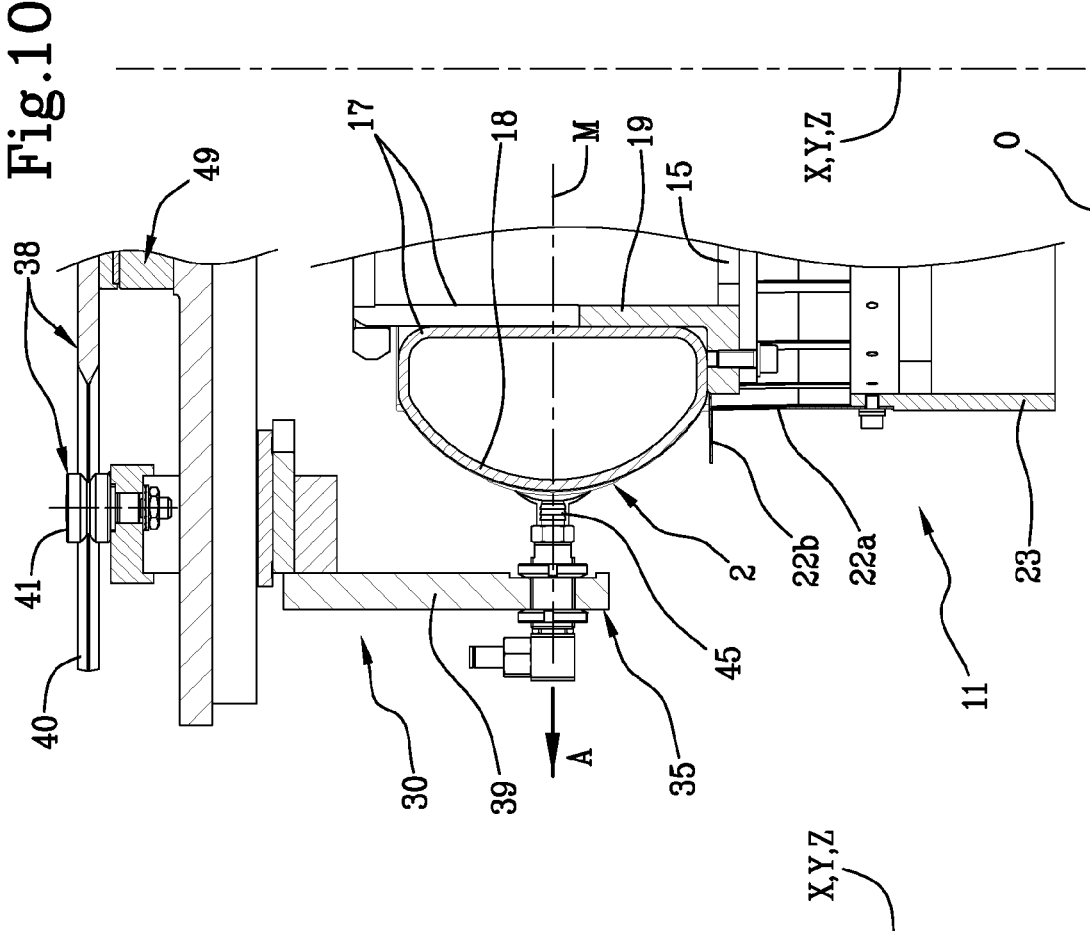
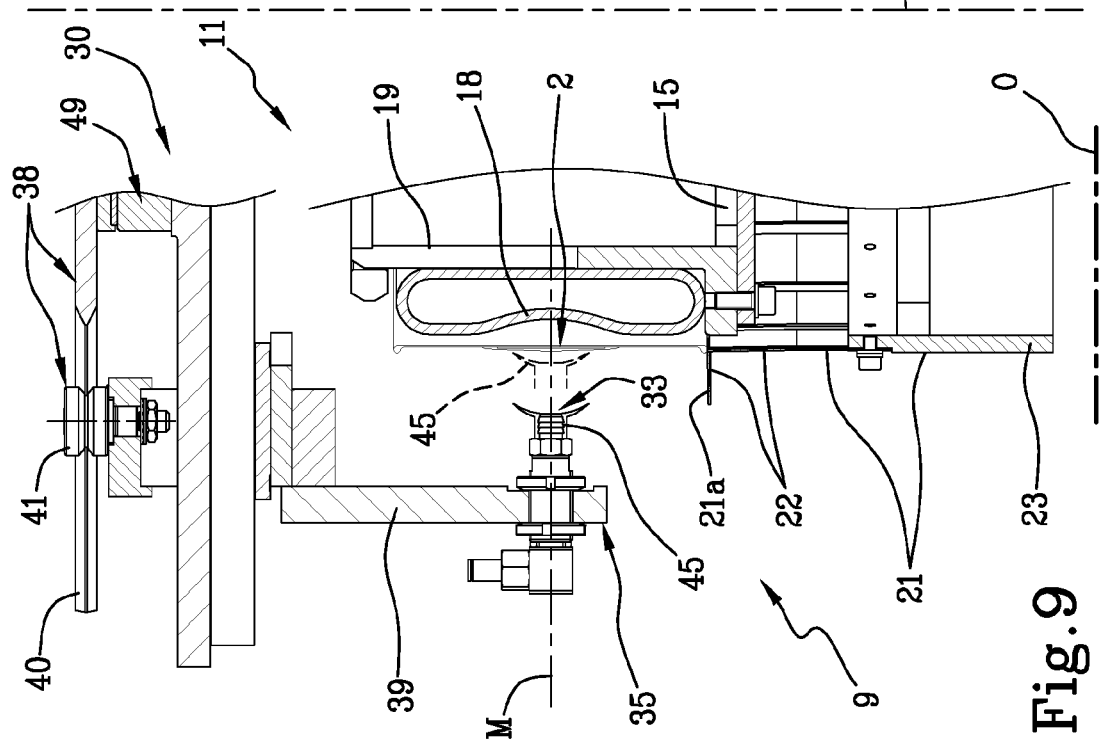

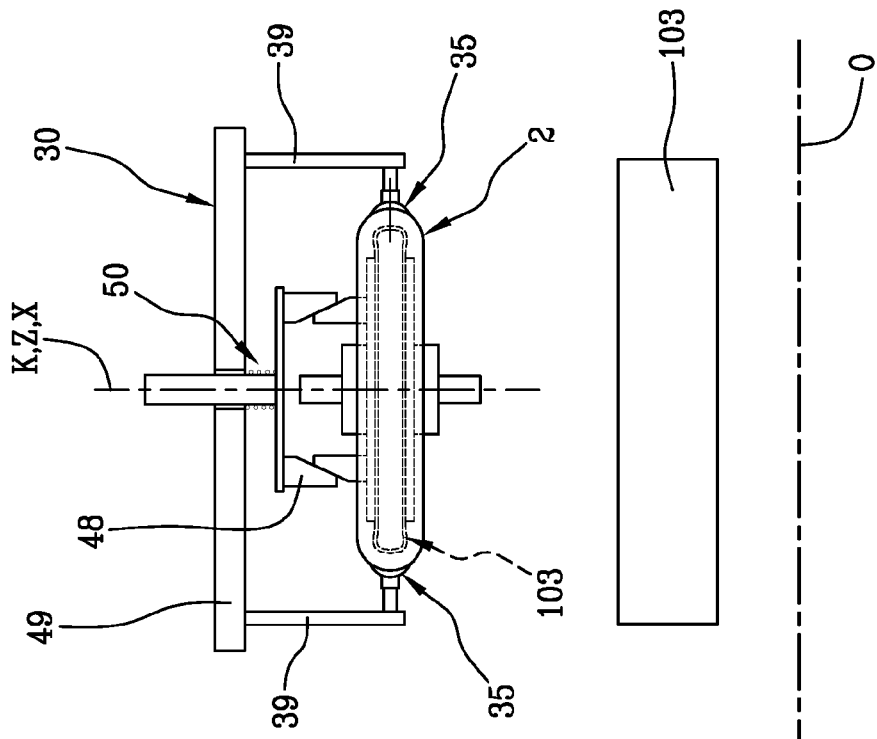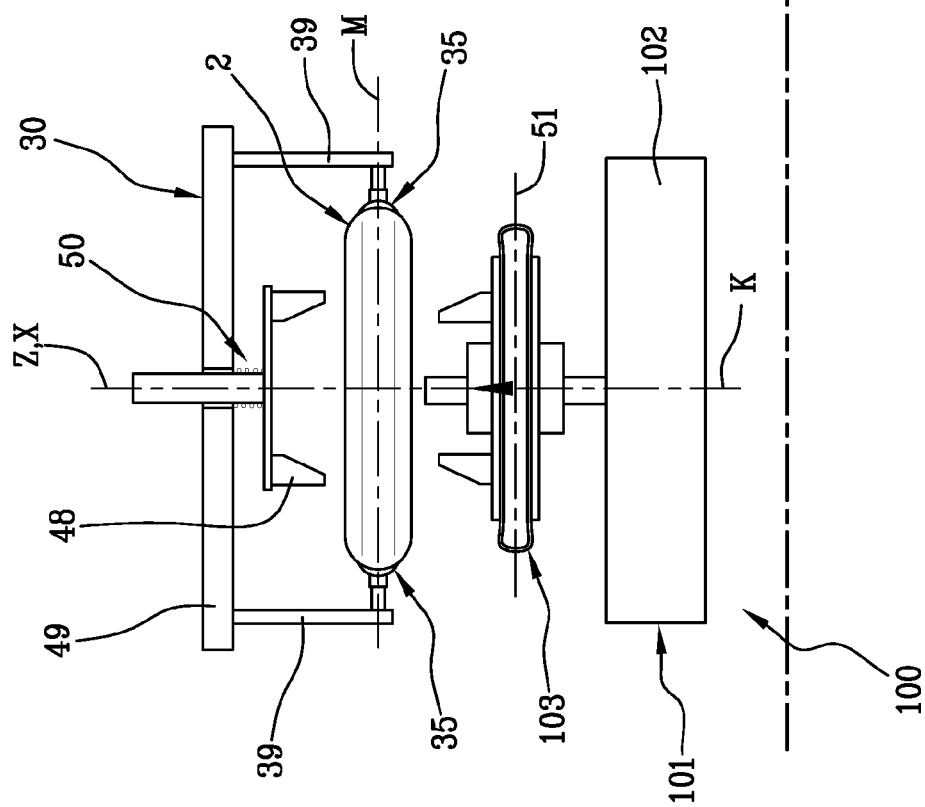

METHOD AND PLANT FOR HANDLING A GREEN TYRE FOR BICYCLE

This application is a national stage filing under 35 U.S.C. § 371 based on International Application No. PCT/IB2017/057478, filed Nov. 29, 2017, which claims the priority of Italian Patent Application No. 102016000131404, filed Dec. 28, 2016; the content of each application is incorporated herein by reference in its entirety.

The present invention relates to a method and a plant for handling a green tyre for bicycle.

The building of a tyre for bicycles usually provides that one or more carcass plies are applied according to a cylindrical configuration around an outer surface of a building drum. Each bead core of a pair of bead cores is fitted or applied around one of the axially opposite end flaps of the carcass ply. The end flaps are then turned up around the respective bead cores. A tread band is then applied around the carcass ply lying against the building drum, in an axially centred position with respect to the bead cores.

The mutual axial distance between the bead cores remains unchanged during the entire building process, including the application of the tread band. This process aspect represents a unique feature that distinguishes bicycle tyres from tyres for motor vehicles. For the latter, in fact, a mutual approach step of the bead cores is normally provided to shape the carcass structure according to a toroidal configuration in the coupling step with the belt structure.

Once the building has been completed, the built green tyre for bicycle is removed from the drum to be transferred in a mould or a vulcanisation press, where the tyre itself is subjected to a moulding and vulcanisation treatment aimed at determining the structural stabilisation thereof via cross-linking of the elastomeric material present therein, as well as optionally imprinting a desired tread pattern on the tread band.

The term "elastomeric material" is used to designate a composition comprising at least one elastomeric polymer and at least one reinforcement filler. Preferably, such a composition further comprises additives such as cross-linking agents and/or plasticisers. Due to the presence of the cross-linking agents, such a material can be cross-linked by heating so as to form the final manufactured article.

The terms "radial" and "axial" and the expressions "radially inner/outer" and "axially inner/outer" are used with reference to the radial direction of the tyre (i.e. to a direction perpendicular to the axis of rotation of the tyre) and to the axial direction of the tyre (i.e. to a direction parallel to the axis of rotation of the tyre). The terms "circumferential" and "circumferentially" are instead used with reference to the annular development of the tyre. A radial plane of the tyre contains the axis of rotation thereof.

The expressions "low", "below", "lower" or "inferiorly", and "high", "above", "upper" or "superiorly" are used to designate a relative position of an element with respect to another and/or of an element with respect to the ground.

"Geometric axis of rotation" of a green tyre means the axis corresponding to the axis of rotation of the vulcanised tyre when mounted in operating conditions on a respective mounting rim. The term "axial centreline plane" of the moulded and vulcanised or green tyre is used to designate a plane perpendicular to the geometric axis of rotation and equidistant from the axially outer portions of the tyre itself.

The term "annular centreline band" is used to designate an annular portion of the green tyre divided symmetrically by the axial centreline plane of the green tyre.

The term "gripping axis" of a gripping device is used to designate a reference axis around which a gripping sector is arranged, comprising at least one gripping area, activated on the green tyre.

The term "tyre width" is used to designate the maximum axial dimension of the moulded and vulcanised tyre.

There essentially are at least two types of vulcanisation press for bicycle tyres, with single location and multiple location, respectively.

Single-location presses are provided with a single vulcanisation mould, normally made of two half-parts, housing a radially expandable vulcanisation membrane, fixed around a central support.

The green tyre coming from the building line is picked up by an operator to be fitted around the vulcanisation membrane. The half-parts of the mould are closed and the membrane, previously mounted inside the vulcaniser, is inflated with pressurised steam or compressed air, or nitrogen or a mixture of the previous fluids, so as to press the tyre against the inner walls the mould and cause the vulcanisation thereof by heat. At the end of the vulcanisation, the mould half-parts are moved away from each other and the operator picks up the vulcanised tyre to replace it with a new green tyre to be vulcanised. This machine configuration, where each mould has a relative membrane previously mounted on the vulcaniser, can generally have up to two, three moulds stacked on top of each other.

There are also multiple-location vulcanisation presses, including multiple vulcanisation moulds stacked vertically on top of each other, generally up to a maximum of 7 moulds where, however, the membrane is not fixed on the vulcaniser. The use of multiple-location presses without fixed membrane or so-called central mechanism requires that an operator provides to introduce an expandable tubular bladder within each green tyre built to be treated. The operator then introduces each tyre coupled to the respective vulcanisation bladder between the half-parts of each vulcanisation mould, making sure that each bladder is connected to a steam feeding conduit, or compressed air, or nitrogen or a mixture of the previous fluids, by means of valve members provided for this purpose. At the end of the vulcanisation, the half-parts of each mould are moved away from each other and the operator picks up the vulcanised tyre to replace it with a new green tyre to be vulcanised and remove the vulcanisation bladder from each vulcanised tyre.

There are multiple-location presses in which the opening and closing cycles of the moulds and of vulcanisation are carried out simultaneously on all tyres loaded into the press. In other cases, a sequential opening of the moulds is carried out so as to perform the vulcanisation of the single tyres with interspersed times according to an on-going process.

The Applicant has noted that bicycle tyres, especially when green, are often without a structural consistency sufficient to allow the proper handling thereof by means of mechanical devices.

This is because bicycle tyres are often provided with bead cores in non-metallic material, for example in composite material based on natural or synthetic fibres (carbon, aramid, etc.) to allow the finished tyre to be folding. Moreover, as stated above, bicycle tyres are often devoid of reinforcement belt layers interposed between the carcass ply/plies and the tread band. In particular, the Applicant has noted that once removed from the building drum, a green bicycle tyre tends to deform under the effect of internal stresses and of its own weight, and this is done randomly and uncontrollably in circumferential direction, where the circular shape is lost due to the low resistance of the bead cores, and/or in the axial development direction due to the shrinkage of the materials or the weight of the components thereof.

For these reasons, bicycle tyres are often produced using mostly manual processes.

The Applicant has also felt that, in order to facilitate mechanised handling, it should be ensured that the green tyre can be picked up safely and reliably and repositioned with suitable accuracy for the purposes of subsequent processing.

The Applicant therefore deems it desirable to find a solution so that green tyres for bicycle can be handled by mechanised handling, maintaining a predetermined precise positioning, despite their tendency to take a substantially random deformed development.

The Applicant has finally found that the retention implemented at a radially outer surface of the green tyre suitably profiled according to a shape that opposes its tendency to take a substantially random deformed development ensures a proper handling of the green tyre both in the handling step and in the arrangement step within a subsequent working station, such as in a mould or vulcanisation press.

More precisely, according to a first aspect thereof, the invention relates to a method for handling a green tyre for bicycle.

Preferably, it is provided to arrange a green tyre for bicycle profiled according to a circular development around a geometric axis of rotation of the green tyre and according to a cross-sectional convex profile in a radially outer direction.

Preferably, the geometric axis of rotation is arranged in a predefined position.

Preferably, it is provided to arrange a gripping device defining a gripping sector distributed around a gripping axis.

Preferably, said gripping sector comprises at least one gripping area that can be activated on the green tyre.

Preferably, it is provided to align said gripping axis with the geometric axis of rotation of the green tyre for coaxially positioning the gripping device around the green tyre.

Preferably, it is provided to activate said at least one gripping area against a radially outer surface of the green tyre so as to retain said green tyre thus arranged.

Preferably, it is provided to handle said gripping device towards a subsequent working station of the green tyre while said gripping device continues to retain the green tyre.

More precisely, according to a second aspect thereof, the invention relates to a plant for handling a green tyre for bicycle. Preferably, a profiling unit is provided, configured for receiving a green tyre for bicycle and for profiling it according to a circular extension around a geometric axis of rotation of the green tyre and according to a convex cross-sectional profile in a radially outer direction, arranging it with said geometric axis of rotation in a predefined position with respect to the profiling unit.

Preferably, a gripping device is provided, defining a gripping sector distributed around a gripping axis.

Preferably, said gripping sector comprises at least one gripping area that can be activated on the green tyre.

Preferably, said gripping device is configured for retaining from the outside said green tyre at a radially outer surface against which said at least one gripping area activates.

Preferably, a transfer member is provided, comprising said gripping device and configured for handling said gripping device towards at least one subsequent working station.

Preferably, a centring group is provided, configured for aligning said gripping axis with the geometric axis of rotation of the green tyre arranged in the profiling unit.

The Applicant believes that retaining the tyre from the outside allows the automated handling thereof by the transfer member, thus overcoming the problems described above related to the operator's safety. The centring of the gripping device with respect to the green tyre and the activation of the gripping area at the radially outer surface of the tyre further allow accurately engaging the tyre itself, thus overcoming the problems related to the springback effect of the materials and ensuring the correct positioning for further processing, for example in the vulcanisation mould.

The present invention, in at least one of the above aspects thereof, can exhibit at least one of the following preferred features.

Preferably, said gripping sector comprises a plurality of said gripping areas distributed discretely around said gripping axis.

The Applicant believes that the use of a plurality of gripping areas discretely distributed around the gripping axis allows a uniform grip of the green tyre.

Preferably, each gripping area is defined by a substantially circular area.

Preferably, the gripping areas are circumferentially distributed around the gripping axis along a same gripping circumference.

Preferably, said gripping sector comprises a single gripping area distributed continuously around said gripping axis.

The Applicant believes that the use of a single gripping area allows a high precision in the relative positioning without introducing excessive structural and/or operating complications.

Preferably, said gripping sector is arranged circumferentially around said gripping axis and defines an annular gripping portion.

The Applicant believes that by operating by means of an annular gripping portion it is possible to improve the relative positioning accuracy between the gripping device and the green tyre and the respective centring thereof.

Preferably, said annular gripping portion is defined by a plurality of gripping areas circumferentially distributed around the gripping axis along a same gripping circumference.

Preferably, it is provided to select an annular gripping band of the green tyre arranged around the geometric axis of rotation at a predetermined height along the geometric axis of rotation itself and activate said at least one gripping area of the annular gripping portion against the radially outer surface of the annular gripping band.

The achievement of a precise positioning of the tyre also along an axial direction is thus facilitated.

Preferably, the annular gripping portion is brought to a radially outer position with respect to the annular gripping band and arranged at the height of the annular gripping band.

Preferably, the annular gripping portion is brought to a radially outer position with respect to the annular gripping band with said gripping circumference aligned with an axial centreline plane of the green tyre.

Preferably, it is provided to adjust the annular gripping portion to an adjustment diameter larger than the outer diameter of the annular gripping band, corresponding to a rest configuration, before bringing it to a radially outer position with respect to the annular gripping band.

Preferably, it is provided to carry out a relative axial translation movement between said annular gripping portion and said annular gripping band to arrange them at the same height along the geometric axis of rotation of the green tyre.

Preferably, it is provided to adjust the annular gripping portion to a gripping diameter smaller than the adjustment diameter, corresponding to a working configuration.

Preferably, said gripping diameter coincides with the outer diameter of the annular gripping band so as to activate said annular gripping portion against the annular gripping band.

Preferably, the adjustment of the annular gripping portion is carried out by adjusting simultaneously and synchronously the radial position of each gripping area.

Preferably, the adjustment of the annular gripping portion is carried out by adjusting autonomously the radial position of each gripping area.

Preferably, said annular gripping band and the relative height along the geometric axis of rotation of the green tyre are selected as a function of the tyre width.

The Applicant believes that the selection carried out as a function of the tyre width ensures the best result in terms of centring and retention of the profiling of the green tyre.

Preferably, said annular gripping band is an annular axial centreline band of the tyre.

Preferably, said annular gripping band belongs to a tread band of the tyre.

The Applicant believes that the selection of an annular axial centreline band or of the tread band improves the gripping and the holding of the green tyre from the outside.

Preferably, activating said gripping area against the radially outer surface of the green tyre comprises arranging said annular gripping portion in contact with said annular gripping band.

Preferably, during the handling of the gripping device, the green tyre is retained by the gripping device hanging only at the annular gripping band.

Preferably, handling said gripping device comprises centring the gripping device with said subsequent working station by aligning said gripping axis with a reference axis of the subsequent working station.

Preferably, it is provided to carry out a relative axial translation movement between said gripping device and said subsequent working station for bringing said annular gripping band at an axial reference arranged at a predetermined height along the reference axis of the subsequent working station.

Preferably, it is provided to release said green tyre in said subsequent working station.

Preferably, said gripping device comprises a plurality of gripping elements distributed around the gripping axis, each gripping element of said plurality of gripping elements defining a gripping area.

Preferably, it is provided to adjust the gripping elements by radially handling them with respect to the gripping axis of the gripping device for activating or deactivating said gripping areas against the radially outer surface of the green tyre.

Preferably, it is provided to adjust the gripping elements by arranging them in a radial adjustment position arranged with respect to the geometric axis of rotation at an adjustment distance larger than the radius of the radially outer surface of the green tyre to be retained, corresponding to a rest configuration.

Preferably, it is provided to adjust the gripping elements by handling them from the adjustment distance to a gripping distance, smaller than the adjustment distance, corresponding to a working configuration.

Preferably, said gripping distance coincides with the radius of the radially outer surface of the green tyre so as to activate said gripping elements against the radially outer surface of the green tyre.

Preferably, the adjustment of the gripping elements is carried out by adjusting simultaneously and synchronously the radial position of all gripping elements.

Preferably, the adjustment of the gripping elements is carried out by adjusting autonomously the radial position of each gripping element.

Preferably, activating said gripping areas against the radially outer surface of the green tyre comprises exerting a pneumatic suction action through said gripping elements adapted to generate a predetermined degree of vacuum between the radially outer surface of the green tyre and the gripping areas.

Preferably, arranging said green tyre comprises exerting a thrust action on a radially inner surface of the green tyre directed radially outwards for expanding said green tyre from the interior up to reaching an expanded configuration.

The thrust action generates a profiling carried out from the interior of the tyre which facilitates access to the radially outer surfaces thereof for the purposes of subsequent handling.

Preferably, said at least one gripping area is activated against the radially outer surface of the green tyre arranged in the expanded configuration.

Preferably, it is provided to cancel said thrust action before handling said gripping device.

Preferably, the gripping elements are adjusted to the gripping distance corresponding to the outer radius of the green tyre in the expanded configuration.

Preferably, the annular gripping portion is adjusted to the gripping diameter corresponding to the outer diameter of said annular gripping band in the expanded configuration.

Preferably, during the handling towards the subsequent processing station, said gripping device holds the green tyre from the outside and keeps said annular gripping band in the expanded configuration.

Preferably, activating said at least one gripping area against the radially outer surface of the green tyre comprises arranging said at least one gripping area in contact with said radially outer surface of the green tyre.

Preferably, said gripping area is activated against the radially outer surface of the green tyre by means of an attraction action acting on the radially outer surface of the green tyre moving away from the geometric axis of rotation.

Preferably, said attraction action is exerted by means of a pneumatic suction action adapted to generate a predetermined degree of vacuum between the radially outer surface of the green tyre and said at least one gripping area.

Preferably, the pneumatic suction action is activated when the radially outer surface and said at least one gripping area are in mutual contact.

Preferably, prior to handling said gripping device, it is provided to verify the attainment of a predetermined degree of vacuum between the radially outer surface of the green tyre and said at least one gripping area, said predetermined degree of vacuum being indicative of the actual gripping of the green tyre.

Preferably, handling said gripping device comprises centring the gripping device with said subsequent working station by aligning said gripping axis with a reference axis of said subsequent working station.

Preferably, it is provided to release said green tyre in a suitable processing position with respect to the subsequent working station.

Preferably, said at least one gripping area is activated against a radially outer surface of the green tyre comprising an axial centreline plane of the green tyre.

Preferably, said at least one gripping area is activated against a radially outer surface of a tread band of the green tyre.

Preferably, during the handling of the gripping device, the green tyre is retained by the gripping device hanging only at the radially outer surface of the tread band.

Preferably, said green tyre is maintained with said geometric axis of rotation arranged transversely with respect to a horizontal geometric plane. Even more preferably, said green tyre is maintained with said geometric axis of rotation arranged vertically.

Preferably, said gripping device is handled with said gripping axis arranged transversely with respect to a horizontal geometric plane. Even more preferably, said gripping device is handled with said gripping axis arranged vertically.

Preferably, said green tyre is arranged and positioned in the subsequent working station defining a reference axis arranged transversely with respect to a horizontal geometric plane. Even more preferably, said green tyre is arranged and positioned in the subsequent working station defining a reference axis arranged vertically.

Preferably, handling said gripping device comprises loading said green tyre in a vulcanisation mould.

Preferably, said gripping elements are circumferentially distributed so that said gripping areas define an annular gripping portion.

Preferably, said adjustment apparatus comprises at least one driving actuator configured for adjusting the radial position of said gripping elements up to reaching a radial adjustment position arranged with respect to the geometric axis of rotation of the green tyre at an adjustment distance larger than the radius of the radially outer surface of the green tyre to be retained, corresponding to a rest configuration.

Preferably, said at least one driving actuator is configured for adjusting the radial position of said gripping elements up to reaching a radial gripping position arranged with respect to the geometric axis of rotation of the green tyre at a gripping distance smaller than the adjustment distance, corresponding to a working configuration.

Preferably, said driving actuator is configured for adjusting simultaneously and synchronously the radial position of the gripping elements.

Preferably, a plurality of actuators is provided, configured for autonomously adjusting the radial position of each gripping element or groups of gripping elements.

Preferably, said gripping elements are arranged in groups and each group is associated with a driving actuator configured for adjusting the radial position thereof.

Preferably, said gripping elements are configured for exerting a pneumatic suction action adapted to generate a predetermined degree of vacuum between the radially outer surface of the green tyre and the gripping areas.

Preferably, each gripping element comprises a suction or spongy interface adapted to come into contact with the radially outer surface of the green tyre. Preferably, said interface is connected to a suction device.

Preferably, a detection device is provided for detecting the degree of vacuum between the radially outer surface of the green tyre and said gripping areas applied by the gripping elements.

Preferably, the detection device is configured for generating a detection signal indicative of the detected degree of vacuum.

Preferably, a control unit is provided, programmed for receiving said detection signal and comparing it with a threshold value indicative of the actual grip of the green tyre.

Preferably, the control unit is programmed for activating said transfer member if said comparison confirms the actual gripping of the green tyre.

Preferably, said gripping device is a loader of a vulcanisation mould.

Preferably, said centring unit comprises a first centring portion associated with the gripping device and a second centring portion associated with the profiling unit. Preferably, said first and second centring portions define a shape coupling configured for aligning said gripping axis with the geometric axis of rotation of the green tyre arranged in the profiling unit.

Preferably, said gripping device comprises a frame supporting said gripping sector.

Preferably, said frame is movable along the gripping axis with respect to the first centring portion.

Preferably, at least one elastic element is interposed between the frame and the first centring portion. Even more preferably, the elastic element is configured and arranged so as to oppose the approach between the frame and the first centring portion and allow the elastic return to a predetermined relative position of the frame and of the first centring portion.

Preferably, said profiling unit is configured for receiving said green tyre for bicycle with said geometric axis of rotation arranged transversely with respect to a horizontal geometric plane. Even more preferably, said profiling unit is configured for receiving said green tyre for bicycle with said geometric axis of rotation arranged vertically.

Preferably, said profiling unit is configured for exerting a thrust action directed radially outwards on a radially inner surface of the green tyre for expanding said green tyre from the interior up to reaching an expanded configuration.

The profiling action carried out from the interior of the tyre facilitates access to the radially outer surfaces thereof for the purposes of gripping and handling.

Preferably, said profiling unit comprises a centring mandrel having a central geometric axis and a radially expandable profiling member extending circumferentially around said central geometric axis.

Preferably, said profiling member comprises an expandable membrane fixed around an outer circumferential surface of the centring mandrel.

Preferably, said profiling member comprises a plurality of sectors radially movable with respect to said central geometric axis.

Preferably, said central geometric axis is arranged transversely with respect to a horizontal geometric plane. Even more preferably, said central geometric axis is arranged vertically.

Preferably, said gripping device is configured for retaining said green tyre hanging with said geometric axis of rotation and said gripping axis arranged transversely with respect to a horizontal geometric plane. Even more preferably, said gripping device is configured for retaining said green tyre hanging with said geometric axis of rotation and said gripping axis arranged vertically.

Preferably, said plant is configured for maintaining said geometric axis of rotation of the green tyre arranged transversely with respect to a horizontal geometric plane. Even more preferably, said plant is configured for maintaining said geometric axis of rotation of the green tyre arranged vertically.

Preferably, an adjustment apparatus is provided, configured for arranging said at least one gripping area in predetermined radial positions with respect to the geometric axis of rotation of the green tyre.

Further features and advantages will become more apparent from the detailed description of a preferred but non-exclusive embodiment of a method and a plant for handling green tyres for bicycle according to the present invention. Such a description is given hereinafter with reference to the accompanying drawings, provided only for illustrative and, therefore, non-limiting purposes, in which:

FIGS. 1 to 4 schematically show cross-sectional views of some operating steps designed to build a green tyre for bicycle;

FIG. 5 shows a perspective bottom view of a plant for handling a green tyre for bicycle according to the invention;

FIG. 6 schematically shows a perspective top view of a profiling unit forming part of the plant according to the present invention;

FIG. 7 schematically shows a cross-sectional view of the profiling unit with a green tyre fitted around a profiling member in contracted condition;

FIG. 8 schematically shows a cross-sectional view of the profiling unit in FIG. 7 during a profiling operation of the green tyre;

FIG. 9 shows a detail in FIG. 7 during the introduction of a gripping device of the green tyre;

FIG. 10 shows the detail in FIG. 8 during the engagement of the green tyre with the gripping device;

Figure 12:
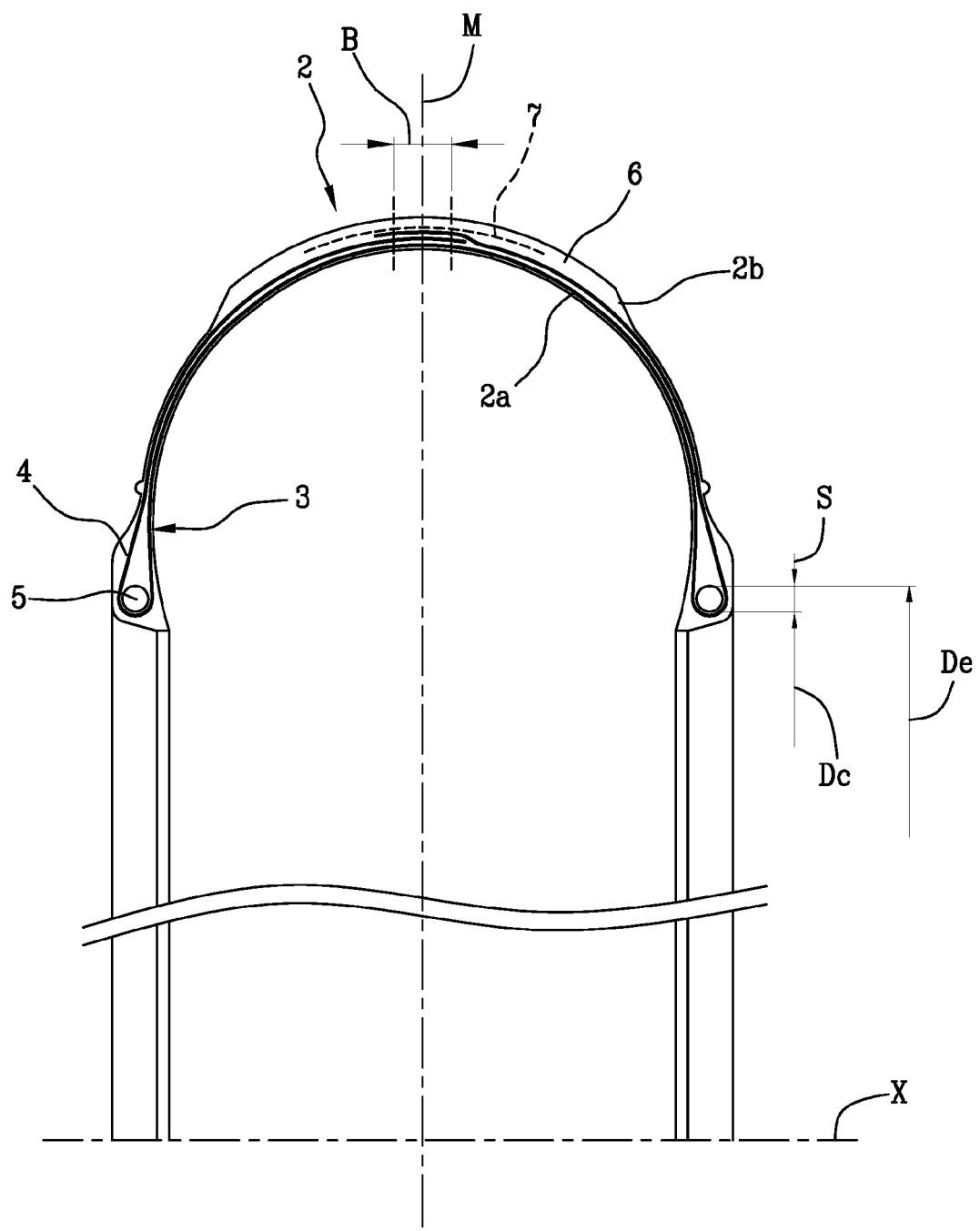
Figure 13:
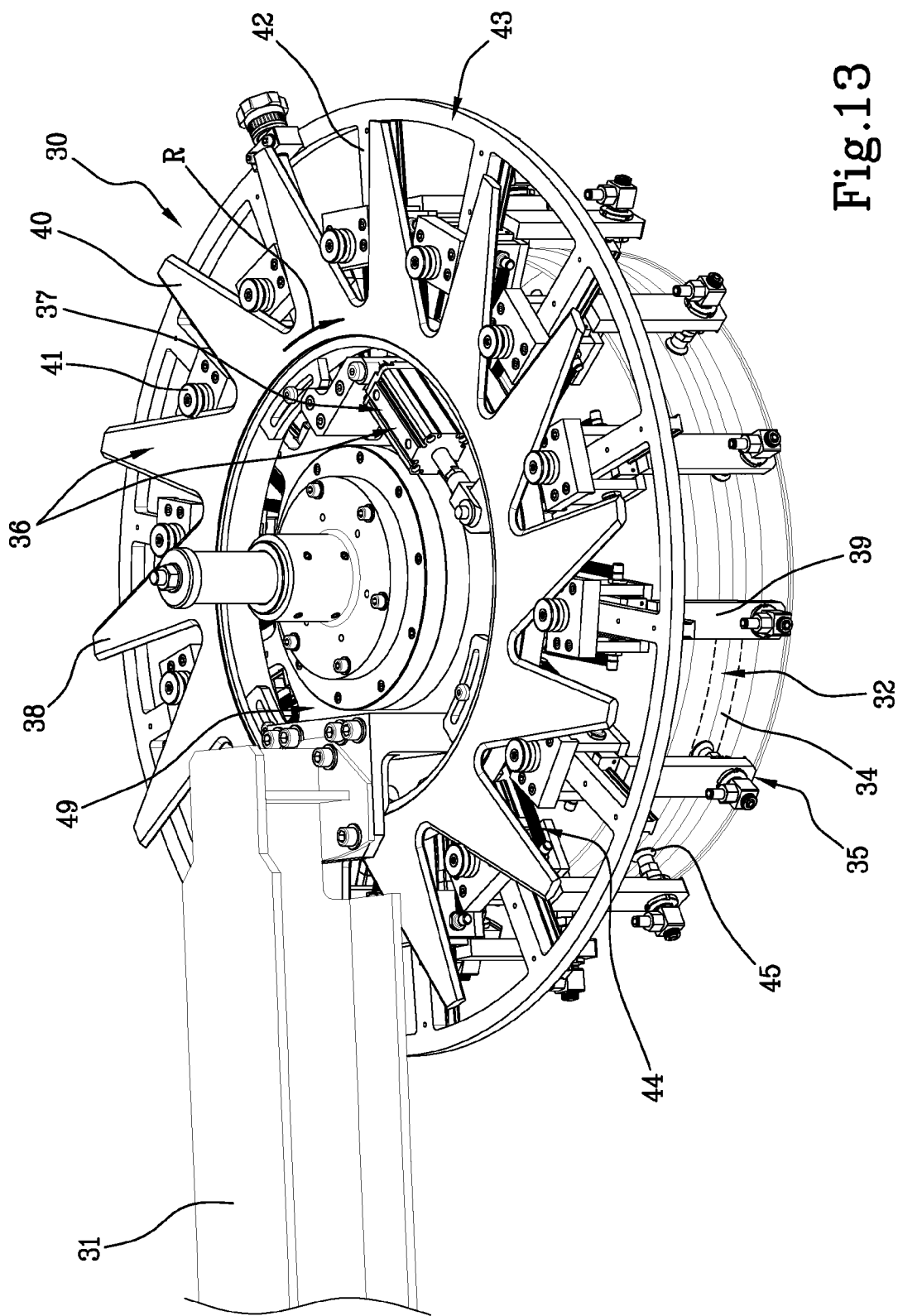
Figure 14:
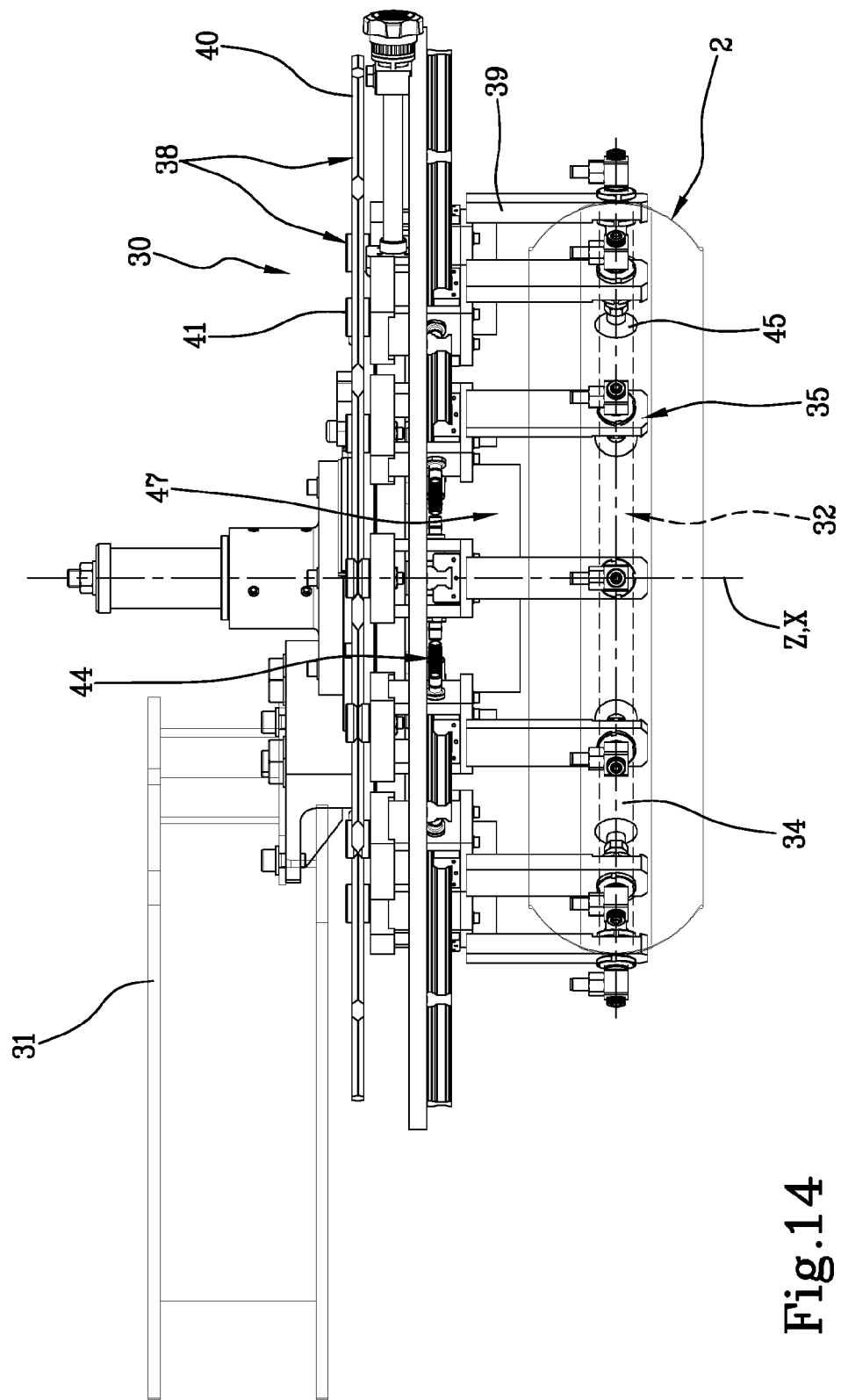
Figure 15:
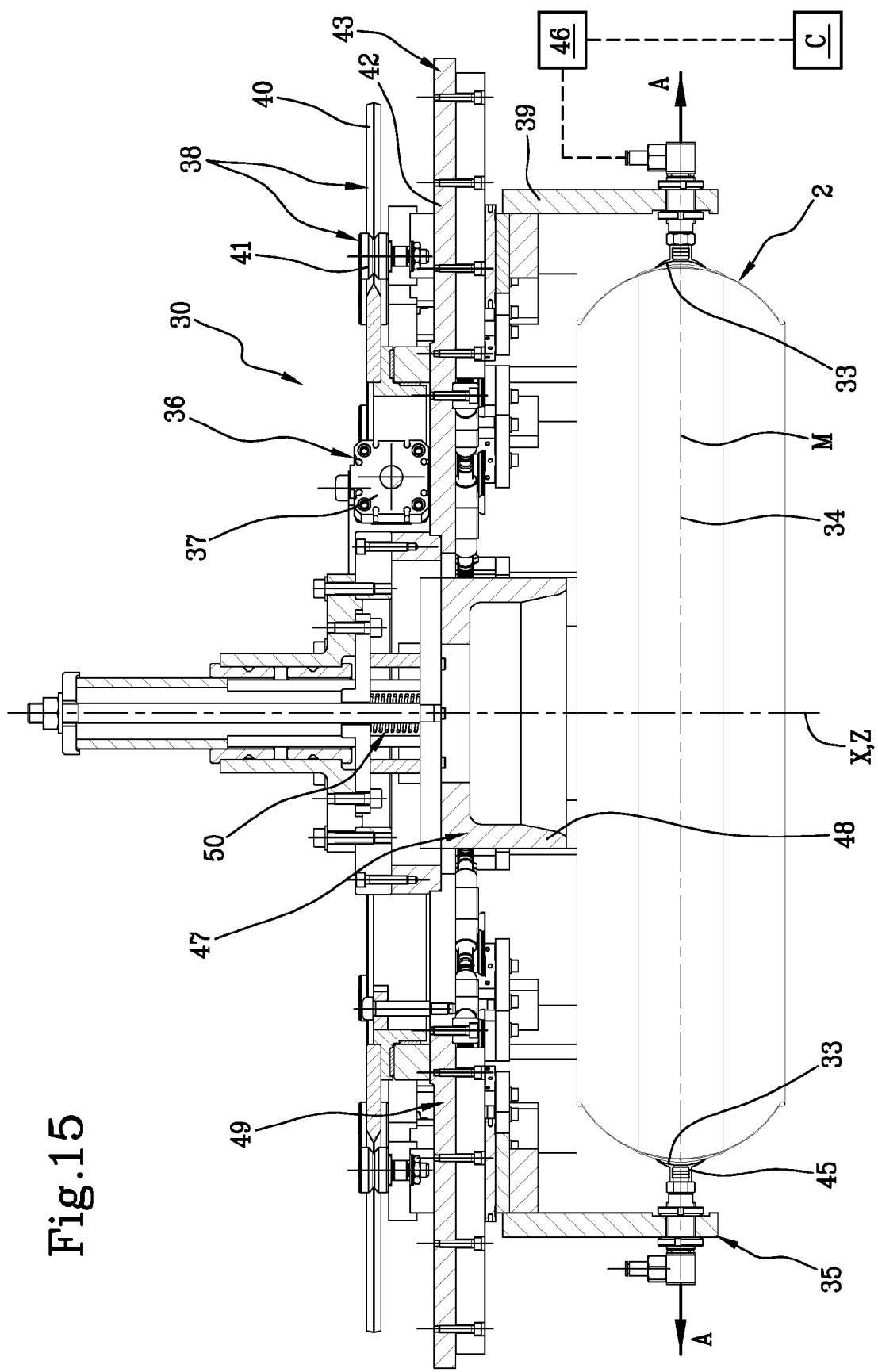
Figure 18:
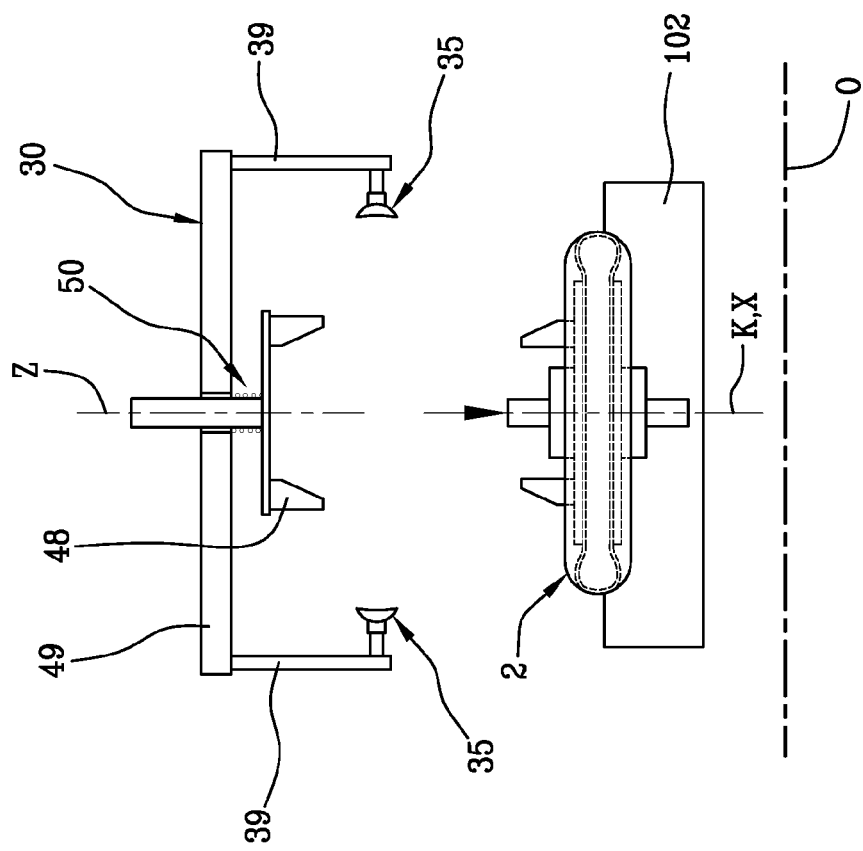

FIG. 12 schematically shows a radial section view of a finished tyre for bicycle;

FIG. 13 schematically shows a perspective top view of the gripping device forming part of the plant according to the present invention which retains a green tyre;

FIG. 14 schematically shows a side view of the gripping device in FIG. 13;

FIG. 15 schematically shows a cross-sectional view of the gripping device in FIG. 13;

FIGS. 16-18 schematically show the gripping device that releases the green tyre to a central body of a vulcanisation mould.

A plant for handling a green tyre for bicycle according to the present invention is globally designated with reference numeral 1.

The present invention is designed for processing tyres 2 for bicycle, of the type schematically exemplified in FIG. 12, for example for use on road, track, mountain bikes, e-bikes, etc.

A radially inner surface 2a, substantially facing towards a geometric axis of rotation "X" of tyre 2, and a radially outer surface 2b substantially facing away from the geometric axis of rotation "X", can be identified in tyre 2.

Plant 1 is configured for maintaining the geometric axis of rotation "X" of the green tyre arranged transversely with respect to a horizontal geometric plane "O", preferably vertically.

Tyre 1 for bicycle has a carcass structure 3 comprising at least one carcass ply 4 having mutually parallel cords embedded in an elastomeric matrix.

Axially opposite end flaps 4a of the carcass ply or plies 4 are engaged to respective bead cores 5, that is, annular anchoring structures integrated in the regions usually identified by the name of "beads" at which the mechanical engagement between tyre 2 in use conditions and a respective mounting rim takes place.

A tread band 6, made of elastomeric material, is applied in a radially outer position with respect to the carcass structure 3.

Preferably, at least two layers of cords having a cross pattern, respectively, can be identified in the carcass structure 3. The cords belonging to each layer have an inclined development according to a predetermined angle, approximately between about 35° and about 65° with respect to a circumferential development direction of tyre 2. For example, the presence of two carcass plies 4 may be provided, radially superimposed on top of each other, each with the respective cords extending along an inclined direction with respect to the circumferential development of tyre 2 and according to an inclined orientation with respect to the cords belonging to the other carcass ply 4. Alternatively, as shown in FIG. 12, a single carcass ply 4 may be provided, the end flaps 4a whereof, turned up around bead cores 5, extend at least up to an axial centreline plane "M" of tyre 2, so as to define each a further radially outer layer of cords having crossed orientation with respect to the cords present in the radially inner layer.

Unlike the tyres typically designed to be used on motor vehicles, tyre 2 for bicycle is generally devoid of a belt structure, that is, of reinforcement belt layers radially interposed between the carcass structure 3 and the tread band 6. In tyres for motor vehicles, these belt layers contribute to increasing the structural strength of tyre 2 and to stabilising the geometry thereof, especially in the crown region, i.e. in the radially outer regions closer to the tread band 6.

In tyre 2 for bicycle, however, at least one circumferential protective layer 7 may be provided, interposed between the tread band 6 and the carcass structure 3. Where present, said at least one circumferential protective layer 7, the task whereof is essentially to protect tyre 2 from puncture, may have a textile structure or be made in the form of continuous layered tape of synthetic material, and preferably has a thickness not larger than 0.5 mm, preferably not smaller than 0.2 mm. Unlike a real belt structure, the circumferential protective layer or layers optionally present in tyre 2 for bicycle do not significantly influence the structural strength, geometric stability and/or dynamic behaviour of tyre 2 itself.

Preferably, on the radially outer surface 2b of tyre 2 for bicycle, portions of carcass ply 4 directly exposed towards the external environment can be identified between the axially outer edges of the tread band 6 and the bead cores 5. Tyre 2 for bicycle is in fact typically not provided with sidewalls, i.e. layers of elastomeric material applied laterally outside the carcass structure 3, each extending between one of the beads and the respective axially outer edge of the tread band.

In tyre 2 for bicycle, thickness "S" of the bead core 5 corresponds to a half of the difference between an outer circumferential diameter "De" and the seating diameter "Dc" of bead core 5 itself.

As schematised in FIGS. 1 to 4, the building of tyre 2 for bicycle in fact provides that, using suitable application devices (not shown) forming part of a building unit, the carcass ply or plies 4 are deposited according to a cylindrical configuration, such as by wrapping around an outer surface of a building drum 9.

By means of bead core application devices (not shown), a pair of bead cores 5, for example made of composite material based on natural or synthetic fibres and/or more seldom, metallic material, is applied at a fixed mutual axial distance "D", each around one of the axially opposite end flaps 4a of the carcass ply 4.

In particular, in the example shown, it is provided that each bead core 5, previously made in the form of finished component, is first fitted around the carcass ply or plies 4 in an axial position corresponding to a circumferential recess 10 formed on the building drum 9 A slight radial expansion of the building drum 9, for example by lever mechanisms forming part of said bead core application devices, causes the application of the bead cores 5 against the carcass ply or plies 4, each at the respective circumferential recess 10.

Alternatively, the bead core application devices may be configured to make each bead core 5 directly on the building drum 9, wrapping one or more continuous cords around the carcass ply or plies 4 according to a plurality of coils axially juxtaposed and/or radially superimposed on each other.

Turning up devices (not shown) operating at the building drum 9 then turn up the end flaps 4a of the carcass plies 4 around the respective bead cores 5. During the turning up, the end flaps 4a may be at least partially superimposed on each other and optionally joined in mutual direct contact.

Tread band application devices (not shown) aid the application of a tread band 6 around the carcass ply 4, in an axially centred position with respect to the bead cores 5. The tread band 6 may be applied in radial superimposition with respect to the turned up end flaps 4a. Once the application has been completed, the turned up end flaps 4a may therefore be partly arranged in an axially inner position with respect to axially opposite edges of the tread band.

On occurrence, the application of the tread band 6 may be preceded by the application of said at least one circumferential protective layer 7.

Figure 1:
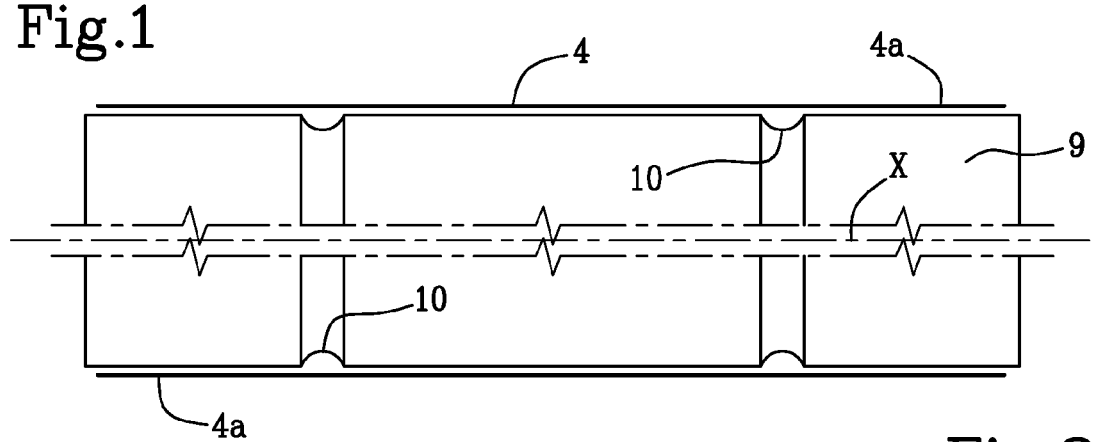
Figure 2:
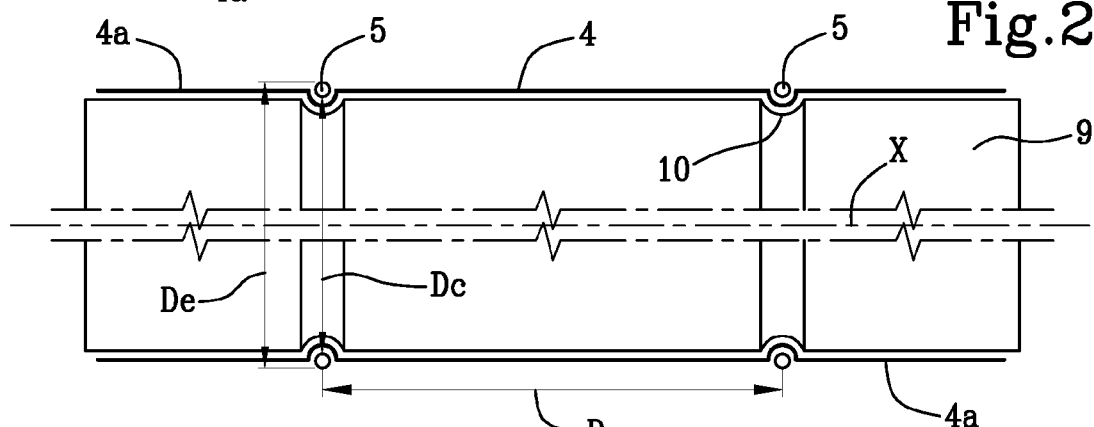
Figure 3:
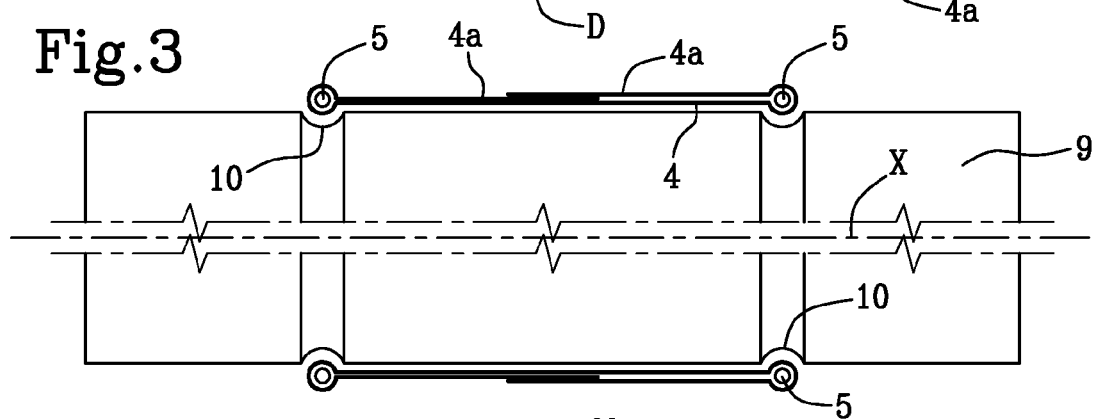
Figure 4:
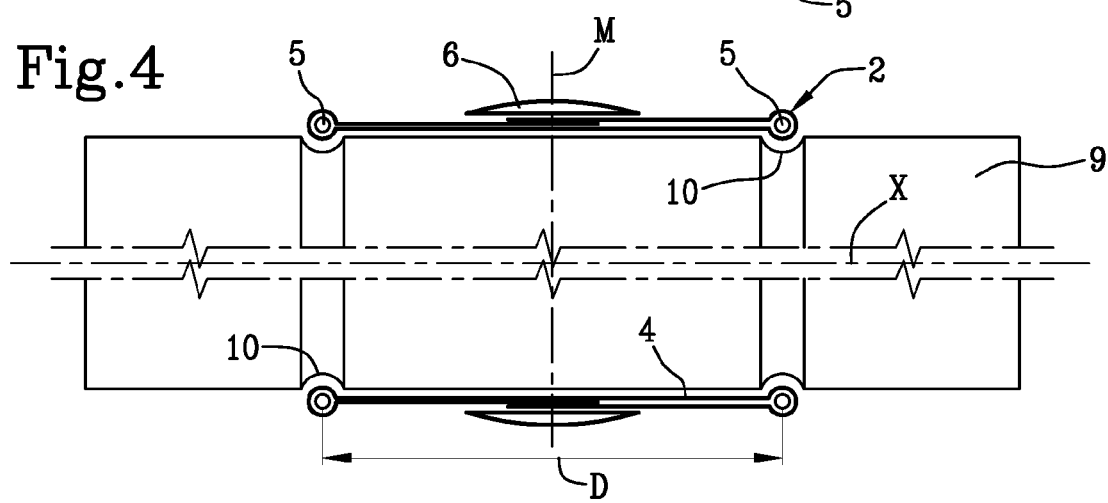
Figure 5:
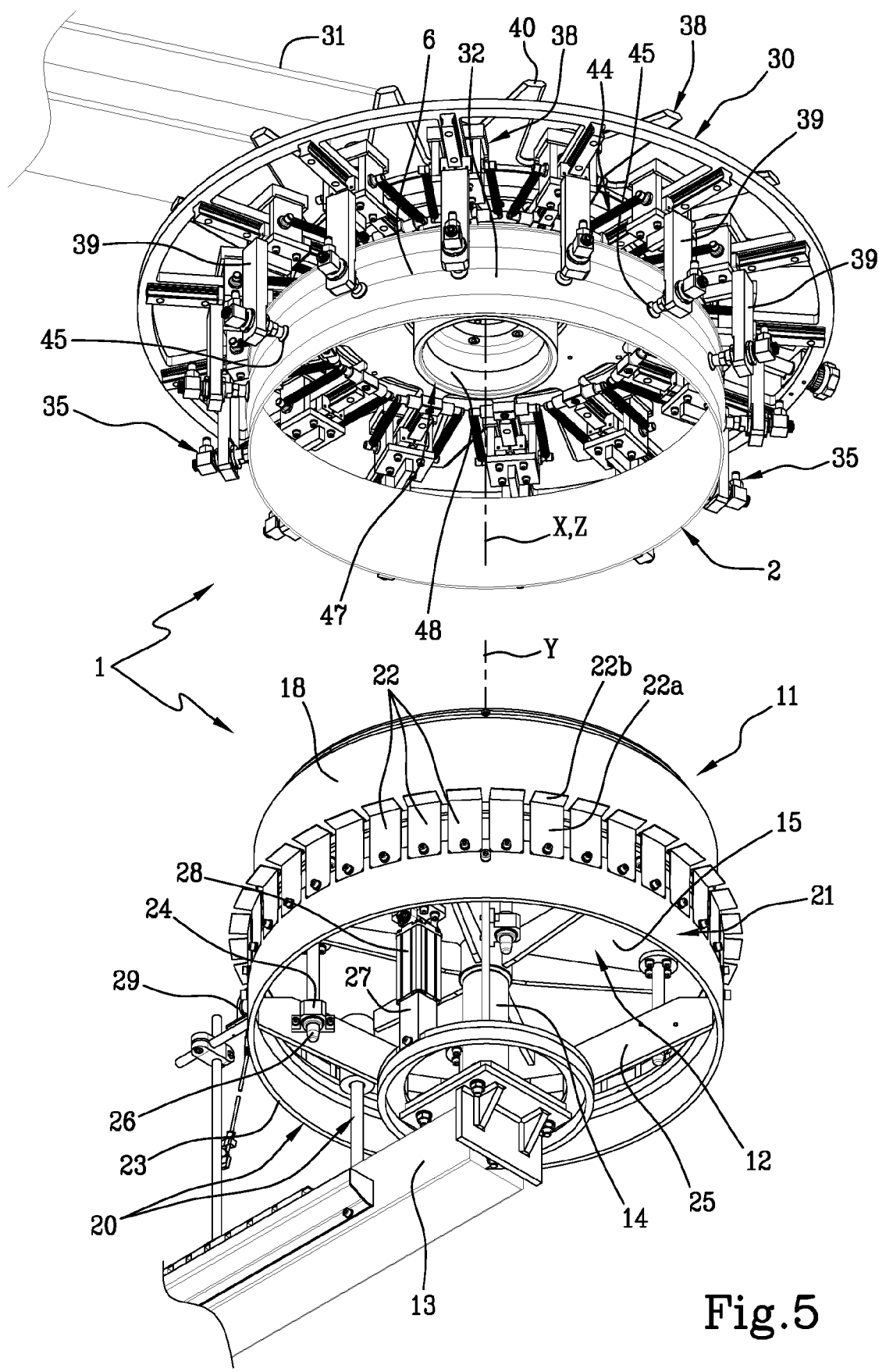
Figure 6:
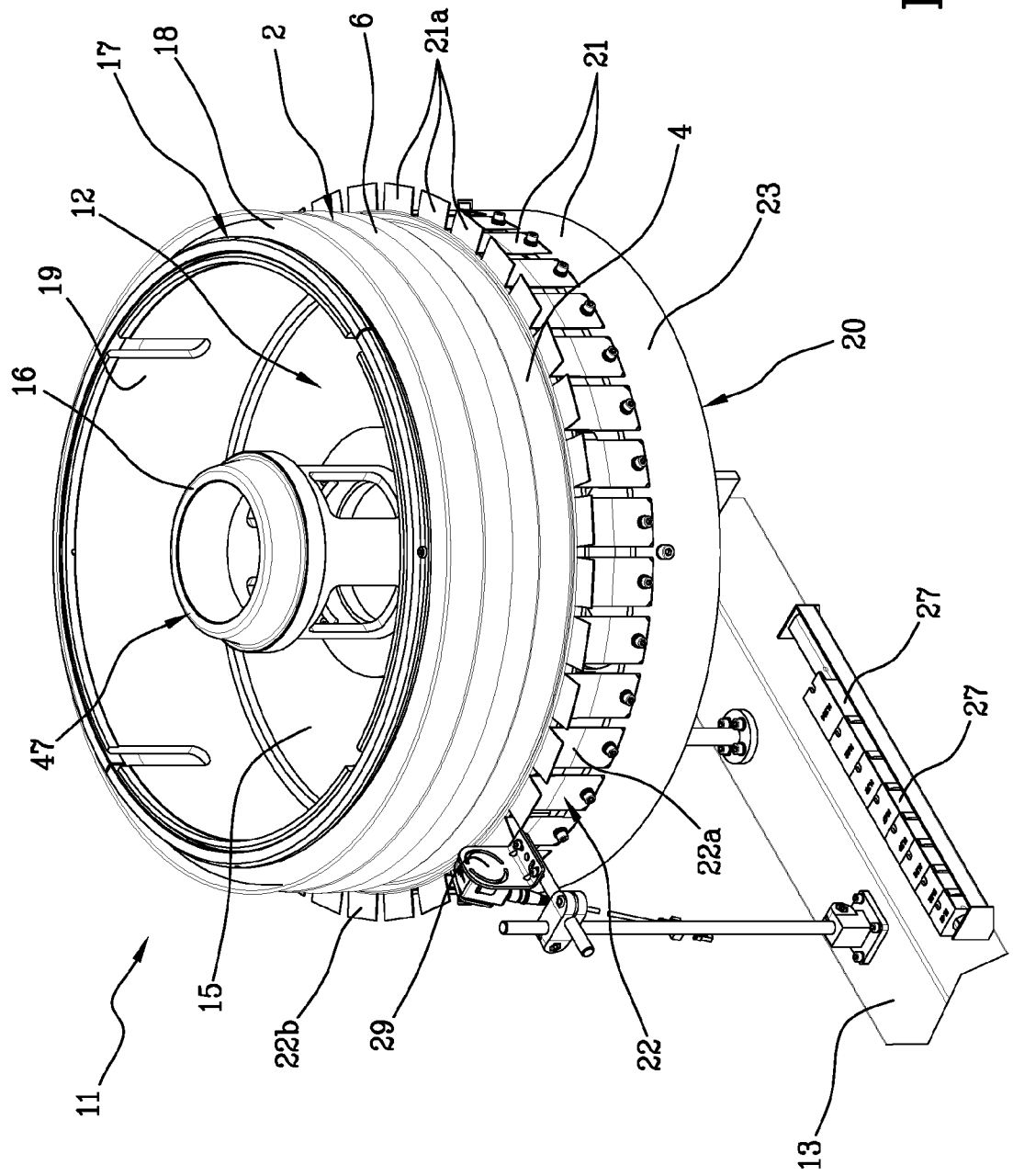

During the application of the tread band 6, an axially central portion of said at least one carcass ply 4, extending axially through an axial centreline plane "M" equidistant from the bead cores 5, lies against the building drum 9 (FIG. 4).

The tread band 6 is preferably applied maintaining the mutual axial distance "D" of the bead cores 5 virtually unchanged. More in particular, the mutual axial distance "D" between the bead cores 5 preferably remains unchanged during the entire building process, including the application of the tread band 6.

Once the building has been completed, the green tyre 2 is removed from the building drum 9 to be subjected to other process steps, for example to be transferred to a vulcanisation press or mould.

To this end, the building drum 9 is radially axially contracted so as to facilitate the removal of the built tyre 2. Being devoid of belt structure and having generally bead cores 5 made from natural or synthetic fibres (carbon, aramid, etc.), tyre 2 for bicycle tends to deform spontaneously or very easily, for example under the effect of its own weight, as soon as it is removed from the building drum 9. In other words, upon removal from the building drum 9, tyre 2 loses its shape with circular development, taking a deformed development in a random and uncontrolled manner.

Moreover, any residual elastic tensions resulting for example from the radial expansion imposed during the application of the bead cores 5 induce the carcass ply or plies 4 to resume their original diameter, especially at the axially central portion. As a result, tyre 2 initially built according to a cylindrical shape, tends to take a cross-sectional profile substantially convex towards a radially inner direction.

The present invention aims to allow a reliable handling of the built tyre 2 for bicycle, for the transfer thereof to a vulcanisation press or mould other working station 100 subsequent to said building unit.

To this end, a profiling unit 11 is provided, comprising a centring mandrel 12 having a central geometric axis "Y", preferably oriented transversely to a horizontal plane "O", for example according to a vertical direction, i.e. perpendicular thereto. The centring mandrel 12 comprises a support structure 13 supporting a central upright 14 to which a support plate 15 is fixed, preferably circular in shape, having a peripheral edge extending concentrically on the central geometric axis "Y". A coupling shank 16 tubular in shape, having a truncated-cone upper end, is preferably fixed on an upper surface of the support plate 15, concentrically to the central geometric axis "Y".

The centring mandrel 12 is operatively coupled to a radially expandable profiling member 17, extending circumferentially around the central geometric axis "Y" and preferably arranged peripherally on the upper surface of the support plate 15. Preferably, the profiling member 17 comprises an expandable membrane 18 extending around the central geometric axis "Y". The expandable membrane 18 is preferably fixed around a support collar 19 fixed to the support plate 15 concentrically to the central geometric axis "Y". The expandable membrane 18 is adapted to be inflated through the controlled introduction of air or other operating fluid under pressure through one or more passages formed, for example, through the support collar 19, to radially expand away from the central geometric axis "Y".

In a possible alternative embodiment not shown, the profiling member 17 may optionally comprise, in addition to or in replacement of the expandable collar 18 and the support collar 19, a plurality of sectors radially movable with respect to said central geometric axis "Y".

The profiling unit 11 is adapted to operatively engage the built green tyre 2, which can be fitted around the profiling member 17, for example by manual intervention of an operator.

The profiling unit 11 is further preferably provided with axial positioning devices 20 of the green tyre 2 along the central geometric axis "Y" of the centring mandrel 12.

Such axial positioning devices 20 may for example comprise a circumferential support 21 having at least one circumferential supporting surface 21a concentric to the central geometric axis "Y" and protruding in a radially outer direction with respect to said profiling member 17, for supporting tyre 2 in supporting relation at an axially outer edge thereof, for example defined by one of the beads arranged inferiorly.

The circumferential support 21 and the centring mandrel 12 are mutually positionable along a direction parallel to the central geometric axis "Y", so as to facilitate the adaptation of the profiling unit 11 to the processing of tyres 2 having respectively different widths.

To this end, it may for example be provided that the circumferential supporting surface 21a of the circumferential support 21 is defined by a plurality of elastically movable sheets peripherally borne by a support ring 23 so as to be circumferentially distributed around the central geometric axis "Y". Each sheet 22 may for example comprise an attachment portion 22a fixed to the support ring 23 and extending away from the latter parallel to the central geometric axis "Y", and a supporting portion 22b extending transversely from one end of the attachment portion 22a, in a spaced apart position with respect to the support ring 23.

Preferably, the support ring 23 engages the centring mandrel 12 slidably along a direction parallel to the central geometric axis "Y". To this end, the circumferential support 21 may be provided with one or more runners 24, for example borne by a radial structure 25 integral with the support ring 23. Runners 24 are operatively engaged along respective guide rods 26 protruding inferiorly from the support plate 15 of the centring mandrel 12. An interchangeable calibrated insert 27, removably engaged between the radial structure 25 and an abutment 28 inferiorly borne by the support plate 15, stops the descent of the centring mandrel 12 at a predetermined height with respect to the circumferential support 21. The availability of a plurality of calibrated inserts 27 may be provided, having different dimensions and selectively usable as a function of the axial dimension of the green tyre 2 being processed.

The presence of the correct calibrated insert 27, preselected as a function of the axial dimension of the tyres being processed, makes the green tyre 2 fitted around the centring mandrel 12, coming into contact with the circumferential supporting surface 21a, arrange itself with respect to the profiling member 17 in a predetermined axial position along the central geometric axis "Y". More precisely, the green tyre 2 is stopped and supported in a position such that the axial centreline plane "M" thereof coincides with an axial centreline plane "M" of the expandable membrane 18, or other type of profiling member 17.

Preferably, sheets 22 are spaced apart from the central geometric axis "Y" by a greater extent than a maximum radius of the profiling member 17 with respect to the central geometric axis "Y" itself, at least in the radially contracted condition. It is therefore possible to prevent mechanical interference between sheets 22 and the profiling member 17, during a mutual axial handling thereof.

The profiling member 17 is adapted to be activated, for example by introducing operating fluid in the expandable membrane 18, when the green tyre 2, previously fitted around the profiling member 17, is supported by the circumferential supporting surface 21a.

To this end, it may be provided that the activation control of the profiling member 17 takes place by a control unit "C" (not shown), upon receipt of an enabling signal emitted by sensor members 29 designed to detect the presence of tyre 2 around the profiling member 17 itself. Such sensor members 29 may for example comprise an optical detector oriented towards the profiling member 17. The optical detector is configured to emit a presence signal when tyre 2 is interposed between the profiling member 17 and the optical detector itself.

Figure 7:
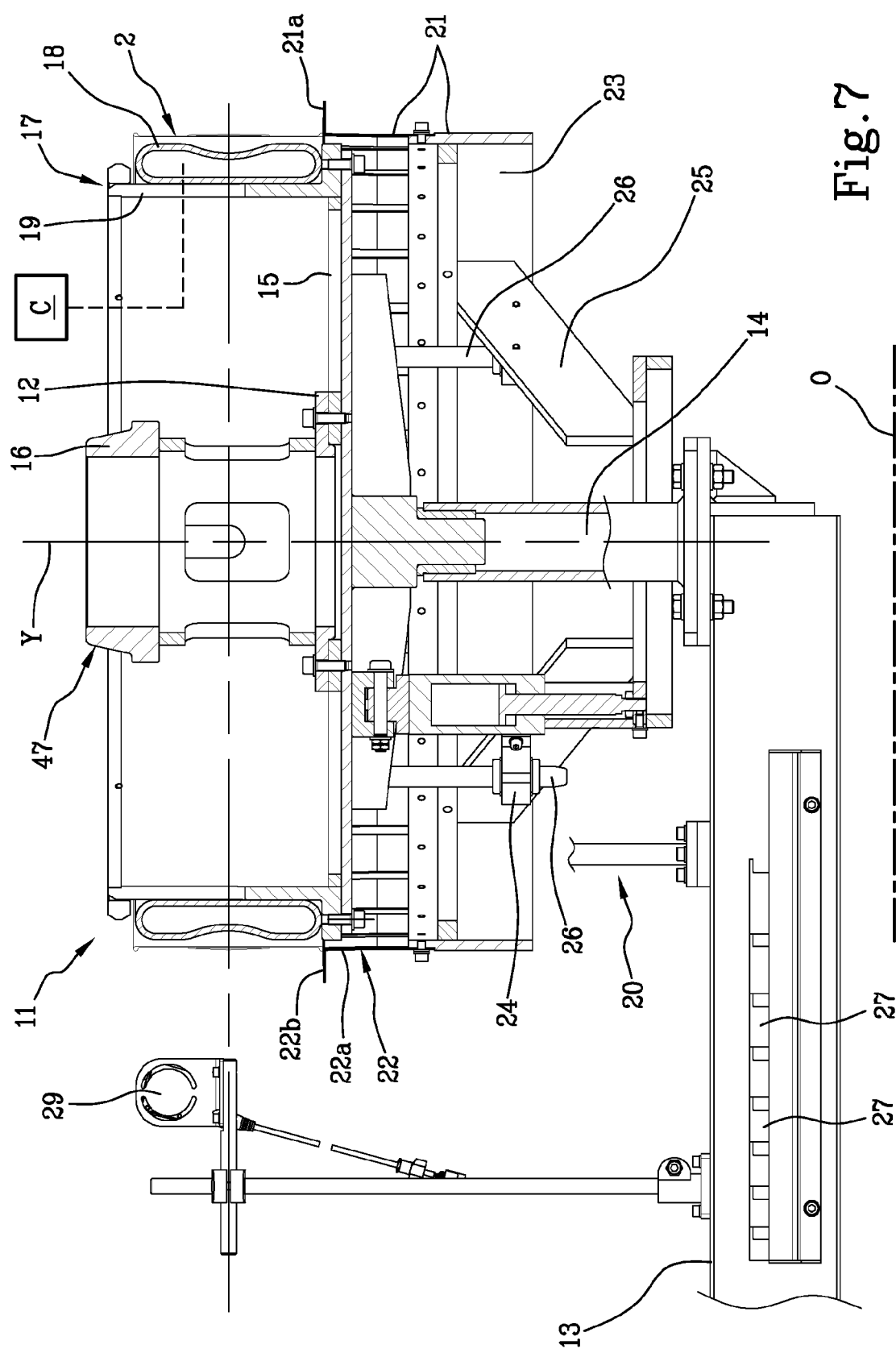

The expandable membrane 18 or other profiling member 17 is consequently expanded from a radially contracted condition (FIG. 7) to a radially expanded condition (FIG. 10). Preferably, in the contracted condition, the profiling member 17 has a maximum diameter smaller than the seating diameter "Dc", so as to have at least one portion distant from the radially inner surface 2a of the built tyre 2. In the expanded condition, the profiling member preferably has, at least in the vicinity of the axial centreline plane "M", a maximum diameter greater than the seating diameter, so as to operate against the radially inner surface 2a of tyre 2, exerting a thrust action in a substantially radial direction from the inside towards the outside (centrifugal) to expand the green tyre from the interior up to reaching an expanded configuration.

On the effect of such a thrust action, the green tyre 2 is therefore subjected to a restoration of the development so as to take again a circular configuration around the geometric axis of rotation "X". At the same time, tyre 2 is centred with the geometric axis of rotation "X" thereof coincident with the central geometric axis "Y" of the centring mandrel 17 and of the profiling member 17.

The expansion of the expandable membrane 18, moreover, tends to translate the tread band 6 towards a radially outer direction with respect to the bead cores 5, so as to impart a cross-sectional convex profile to the green tyre 2 towards a radially outer direction.

In order to facilitate the profiling of tyre 2 in the manner described above, the initial contact between the expandable membrane 18 and the built tyre 2 preferably takes place in the vicinity of the axial centreline plane "M" of tyre 2 itself.

Since the green tyre 2 positioned around the profiling member may have a significantly deformed configuration, it is preferable that the profiling of tyre 2 itself is not carried out by a single expansion action, but by two or more expansion actions cyclically repeated and alternating with respective contraction actions. It may further be provided that such cyclically repeated expansion actions follow one another respectively with progressively increasing intensity.

Figure 8:
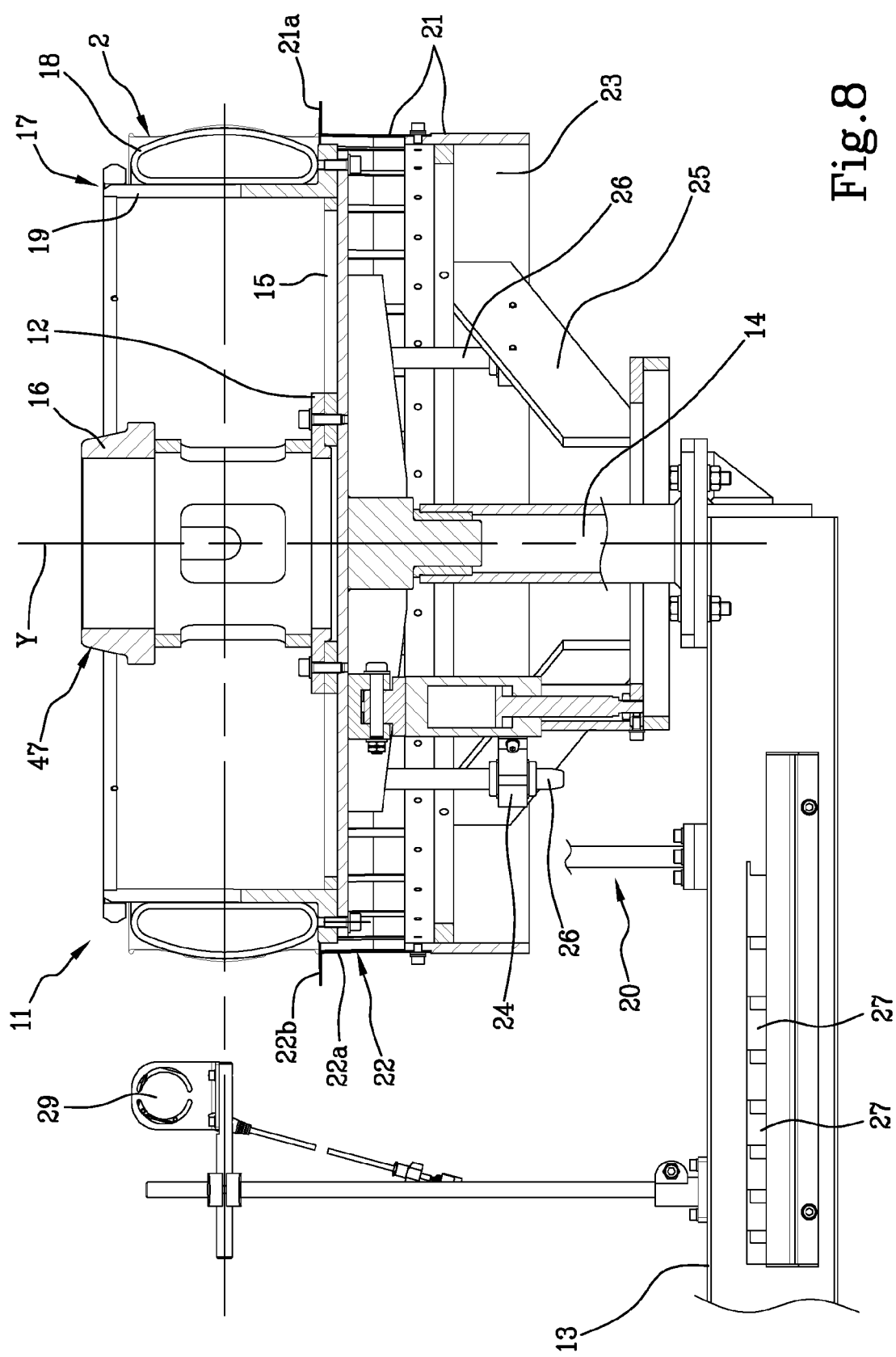

More in particular, a first expansion action may be carried out by imposing a relatively small expansion to the profiling member 17 with respect to that imposed during a subsequent expansion action. In the example shown, to this end it may be provided that the first expansion action is carried out by feeding operating fluid in the expandable membrane 18 at a first pressure value, suitable for determining a sufficient circumferential stretching of tyre 2. In particular, the tyre may thus be stretched according to a circular configuration coaxially to the central geometric axis "Y". For example, the first expansion action may be carried out by feeding the operating fluid at a pressure of between about 10 KPa and about 150 KPa, for a time indicatively of between about 1 s and about 25 s. As a result of the first expansion action, the profiling member 17 is preferably brought to a semi-expanded condition, intermediate between the contracted condition and the expanded condition (FIG. 8).

The operating fluid is then discharged from the expandable membrane 18 to determine a first contraction, so as to obtain the detachment, preferably complete, from the inner surface of tyre 2.

Immediately after the contraction, indicatively within a time not exceeding about 30 s, operating fluid is again introduced in the expandable membrane 18 at a higher pressure than the first value, so as to determine a second expansion action and subsequent profiling of tyre 2. For example, the second expansion action may be carried out by feeding the operating fluid at a pressure of between about 10 KPa and about 150 KPa, for a time indicatively of between about 1 s and about 25 s. As a result of the second expansion action, the profiling member 17 can be brought to the expanded condition.

Since the green tyre 2 is already pre-profiled due to the first expansion action, the action of the expandable membrane 18 during the second expansion action may be more uniform, so as to facilitate the profiling of tyre 2 without causing distortions due to localised stresses.

On occurrence, more than two expansion action interspersed with respective contraction actions may be provided.

In use, the profiling unit 11 allows receiving and arranging a green tyre 2 for bicycle profiled according to a circular development around a geometric axis of rotation "X" thereof and according to a cross-sectional convex profile in a radially outer direction. The geometric axis of rotation "X" is therefore arranged in a predefined position with respect to the profiling unit 11. Preferably, the profiling unit 11 is configured for receiving the green tyre for bicycle with the geometric axis of rotation "X" arranged transversely with respect to a horizontal geometric plane "O", even more preferably vertically. After or concurrently with the execution of the profiling action, the green tyre 2 is adapted to be engaged by a gripping device 30 borne by a transfer member 31. The transfer element 31 provides to remove the green tyre from the profiling unit 11 and is configured for handling the gripping device 30 towards at least a subsequent working station, such as a vulcanisation press, while the gripping device 30 continues to retain the green tyre.

Preferably, the transfer member 31, for example comprising a robotic arm, preferably of the anthropomorphic type with at least 6 axes, or other handling unit, is configured to engage the green tyre 2 by the gripping device 30, while tyre 2 itself is mechanically retained so as to maintain said cross-sectional convex profile in a radially outer direction.

The gripping device 30 defines a gripping sector 32 distributed around a gripping axis "Z" and comprising at least one gripping area 33 which can be activated on the green tyre. When the gripping device 30 retains the green tyre 2, the gripping axis "Z" coincides with the geometric axis of rotation "X", therefore, in this situation, reference will be made without distinction to the one or the other in the continuation of the present description.

According to a possible embodiment, of which the accompanying drawings are a non-limiting example, the gripping sector 32 comprises a plurality of gripping areas 33 distributed discretely around the gripping axis. Preferably, each gripping area 33 is defined by a substantially circular area. Preferably, the gripping areas are circumferentially distributed around the gripping axis "Z" along a same gripping circumference 34.

According to an alternative embodiment, the gripping sector 32 may comprise a single gripping area distributed circumferentially around the gripping axis.

In particular, the gripping area 33 is activated against a radially outer surface of the green tyre 2 so as to retain it. In particular, the activation of the gripping area 33 generates an attraction action "A" acting on the radially outer surface of the green tyre moving away from the geometric axis of rotation "X". In the case of a plurality of gripping areas 33, the activation thereof generates a plurality of attraction actions "A" distributed around the geometric axis of rotation "X".

Such attraction action(s) is/are exerted by means of a pneumatic suction action adapted to generate a predetermined degree of vacuum between the radially outer surface of the green tyre and the respective gripping area.

Preferably, the gripping sector 32 is arranged circumferentially around the gripping axis "Z" and defines an annular gripping portion. In other words, with reference to the embodiment shown in the accompanying drawings in which a plurality of gripping areas 33 is provided, distributed discretely circumferentially around the geometric axis of rotation "X", the gripping sector 32 corresponds to the region of the gripping device 30 intended to interact with the green tyre and formed by a sequence of gripping areas 33.

Preferably, the gripping device 30 is configured for retaining the green tyre hanging with the geometric axis of rotation "X" thereof and the gripping axis "Z" arranged transversely with respect to a horizontal geometric plane "O", preferably vertical. The gripping device 30 preferably comprises gripping elements 35 distributed around the gripping axis "Z" and defining each a gripping area 33 of tyre 2. Preferably, the gripping elements 35 are circumferentially distributed so that the gripping areas 33 define the annular gripping portion.

Figure 11:
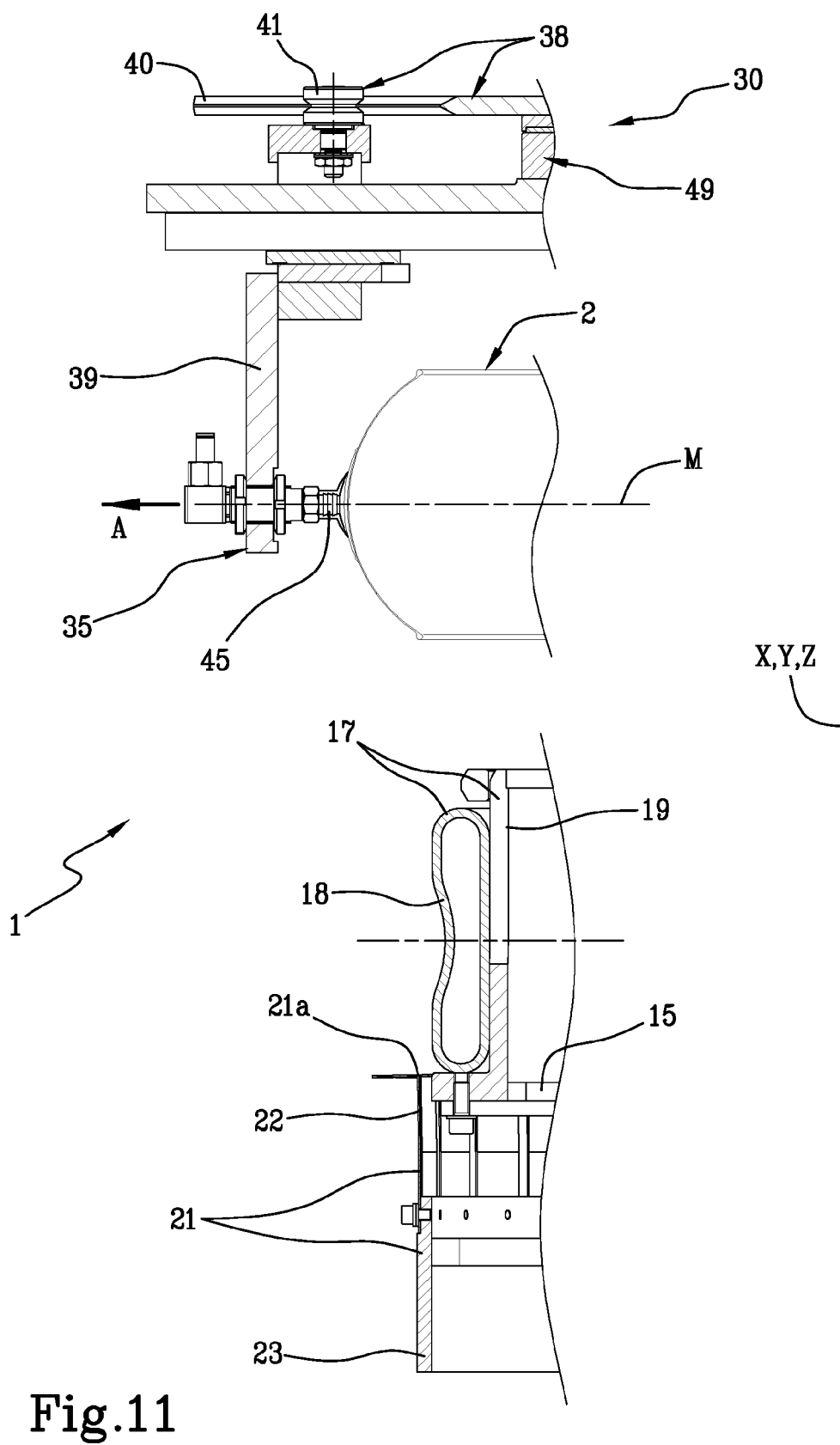
FIG. 11 shows the green tyre engaged with the gripping device and removed from the profiling unit.

An adjustment apparatus 36 is configured for arranging each gripping area 33 in predetermined radial positions with respect to the gripping axis "Z" and thus with respect to the geometric axis of rotation "X" of the green tyre. Preferably, the adjustment apparatus comprises at least one driving actuator 37. On the action of the driving actuator 37, the gripping elements 35 and thus the gripping areas 33 are radially movable with respect to the gripping axis "Z", between a rest condition, in which they are radially distanced with respect to the gripping axis "Z" (FIG. 9), and a working condition in which they are radially approached with respect to the gripping axis "Z" (FIGS. 10 and 11).

Preferably, the driving actuator 37 is configured for adjusting the radial position of the gripping elements 35 up to reaching a rest configuration corresponding to a radial adjustment position arranged with respect to the geometric axis of rotation "X" of the green tyre at an adjustment distance larger than the radius of the radially outer surface of the green tyre to be retained.

Moreover, the driving actuator 37 is configured for adjusting the radial position of the gripping elements 35 up to reaching a working configuration corresponding to a radial gripping position arranged with respect to the geometric axis of rotation "X" of the green tyre at a gripping distance smaller than the adjustment distance.

In the case of the annular gripping portion, the driving actuator 37 is configured for adjusting the annular gripping portion to an adjustment diameter larger than the outer diameter of an annular gripping band of the green tyre, corresponding to the rest configuration, and subsequently to a gripping diameter, smaller than the adjustment diameter, corresponding to the working configuration.

It may be provided that a single driving actuator 37 operates simultaneously on multiple gripping elements 35, preferably all, for example through a handling mechanism 38 configured to radially move them in a simultaneous and synchronised manner. Each gripping element 35 may for example comprise a support 39, such as plate-shaped and extending parallel to the gripping axis "Z" and having an upper end constrained to the handling mechanism 38 and a lower end defining the gripping area 33. According to a possible embodiment of which the accompanying examples are a non-limiting example, the handling mechanism 38 comprises a cam disc 40 handled in rotation around the gripping axis "Z" by the driving actuator 37 and a plurality of rollers 41, each associated with a support 39. Supports 39 are radially movable along a spoke 42 of a radial element 43. An elastic return device 44 is interposed between each support 39 and the radial element 43. As a result of an actuation of the driving actuator 37, the cam disc 40 rotates according to arrow "R" in FIG. 13 and causes the radial centrifugal displacement of supports 39 in contrast to the elastic return device 44. The rotation in the opposite direction of the cam disc 40 allows the centripetal radial displacement of supports 39 by the effect of the elastic return device 44.

According to a possible alternative, not shown, a plurality of actuators is configured for autonomously adjusting the radial position of each gripping element 35 or groups of gripping elements.

According to a possible embodiment, the gripping elements 35 may be arranged in groups and each group is associated with a driving actuator configured for adjusting the radial position thereof in a simultaneous and synchronised manner or autonomously.

Preferably, the gripping elements 35 are configured for exerting a pneumatic suction action adapted to generate a predetermined degree of vacuum between the radially outer surface 2b of the green tyre and the gripping areas 33.

Preferably, each gripping element 35 comprises a suction or spongy interface 45 adapted to come into contact with the radially outer surface of the green tyre 2. Preferably, interface 45 is connected to a suction device by means of a suction conduit.

According to a possible embodiment, of which the accompanying drawings are a non-limiting example, interface 45 defines a gripping area 33.

Preferably, a detection device 46 is provided for detecting the degree of vacuum applied by the gripping elements between the radially outer surface of the green tyre and the gripping areas 33 and for generating a detection signal indicative of the vacuum degree detected. Preferably, the control unit "C" is programmed for receiving the detection signal, comparing it with a threshold value indicative of the actual gripping of the green tyre 2 and activating the transfer member 31 if the above comparison confirms the actual gripping of the green tyre.

A centring group 47 is configured for aligning the gripping axis "Z" with the geometric axis of rotation "X" of the green tyre arranged in the profiling unit 11 and thus with the central geometric axis "Y" of the profiling member 17.

According to a possible embodiment, the centring unit 47 comprises a first centring portion associated with the gripping device 30 and a second centring portion associated with the profiling unit 11. In particular, the first and second centring portion define a shape coupling configured for aligning the gripping axis "Z" with the geometric axis of rotation "X" of the green tyre arranged in the profiling unit 11, i.e. with the central geometric axis "Y" of the profiling member 17.

According to the embodiment shown, the first portion associated with the gripping device 30 is implemented by a tailstock 48 tubular in shape, having an upper end of with truncated-cone shape. The second centring portion associated with the profiling unit 11 is implemented by said coupling shank 16.

Preferably, the gripping device 30 comprises a frame 49, for example comprising the radial element 43, supporting the gripping sector 32. Frame 49 is movable along the gripping axis "Z" with respect to the first centring portion. Preferably, at least one elastic element 50 is interposed between 49 frame and the first centring portion. According to the example shown, the elastic element 50 is configured and arranged so as to oppose the approach between frame 49 and the first centring portion and allow the elastic return to a predetermined relative position of frame 49 and of the first centring portion.

In use, plant 1 as described above allows implementing a method for handling a green tyre for bicycle according to the present invention in which the profiling unit 11 arranged the profiled green tyre as described above.

The gripping axis "Z" of the gripping device 30 not associated with a green tyre is aligned with the geometric axis of rotation "X" of the green tyre arranged in the profiling unit 11 and thus with the central geometric axis "Y" of the centring mandrel 12.

This alignment is designed to coaxially position the gripping device 30 around the green tyre. In particular, the transfer member 31 places the gripping device 30 with the gripping elements 35 arranged in the rest configuration coaxially above the profiling unit 11.

An axial translation, for example descent, of the gripping device 30 is then determined along the gripping axis "Z", to obtain the mutual engagement between the coupling shank 16 and tailstock 48 counter-shaped thereto, coaxially borne by the gripping device 30. The engagement of tailstock 48 with the coupling shank 16 defines a shape coupling configured to determine a precise alignment of the gripping device 30 with the gripping axis "Z" thereof coaxially aligned with respect to the central geometric axis "Y" of the profiling member 17 and thus, with respect to the geometric axis of rotation "X" of the green tyre 2. The relative movement between frame 49 and tailstock 48 determines the correct relative positioning along the geometric axis of rotation "X" corresponding to the axial gripping position. As exemplified in FIG. 9, in the axial gripping position, the gripping areas 33 are placed at the axial centreline plane "M" of tyre 2 arranged in the profiling unit 11.

Preferably, the lowering towards the axial gripping position is carried out by maintaining the gripping elements 35 in the rest condition, thus reducing the risk of sliding and/or interference against the green tyre 2. Upon reaching the axial gripping position, the above driving actuator 37 can be activated, which causes the translation of the gripping elements 35 towards the working configuration, approaching the tread band 6 of tyre 2.

Moreover, it is further preferably provided that the lowering of the gripping device 30 towards the axial gripping position is carried out after the beginning of the profiling operation of tyre 2, but before such a profiling operation has been completed.

More in particular, such a lowering takes place for example when the profiling member 17 has been returned to the contracted condition after carrying out at least one expansion action.

Upon reaching the working configuration, the gripping elements 35 may be still slightly distanced with respect to tyre 2. In this case, a last expansion action imposed to the profiling member 17 brings the tread band 6 against the gripping elements 32, thus expanding the green tyre from the interior up to reaching the expanded configuration.

Alternatively, it may be provided that the radial contraction of the gripping elements 35 takes place when the profiling member 17 and thus the green tyre has already reached the expanded condition following the last expansion action. In this case, upon reaching the working configuration, the gripping elements 35 come into contact with tyre 2, against the outer surface of the tread band 6 while the profiling member 17 and thus the green tyre is preferably in the expanded condition.

In both cases, by means of the profiling unit 11, it is provided to exert a thrust action on a radially inner surface of the green tyre directed radially outwards for expanding the green tyre from the interior up to reaching the expanded configuration (FIG. 10).

When the radially outer surface 2b of the tire and the at least one gripping area 33 are in mutual contact, the pneumatic suction action is activated.

The pneumatic suction effect produced by interface 45 makes the gripping elements 35 be operatively activated against a radially outer surface of the tread band 6, exerting attraction actions "A" directed in radial distancing of the geometric axis of rotation "X" of tyre 2, and distributed along the whole circumferential development of the latter (FIG. 10).

The engagement of tyre 2 to the transfer member 31 can thus be obtained while tyre 2 itself is still mechanically retained by the profiling member 17, which imposes retaining the cross-sectional convex profile in a radially outer direction.

Once the engagement has taken place, the profiling member 17 can be returned to the radially contracted condition, so that tyre 2 can be axially removed from the profiling unit 11 by the effect of the lifting of the gripping device 30. In other words, the thrust action which brings the green tyre to the expanded configuration is cancelled before handling the gripping device 30 (FIG. 11).

The attraction actions exerted on the tread band 6 by the gripping elements 35 mechanically retain tyre 2, thus ensuring the maintenance of the latter in the profiled condition even after the disengagement thereof from the profiling member 17. Tyre 2 is therefore adapted to retain a stable geometrical shape for the correct transfer to the next working station. In particular, retaining the profiling condition favours the correct engagement of tyre 2 with the members designed to the treatment thereof in the vulcanisation press or other subsequent working station.

In the case in which, as shown, the gripping sector 32 is arranged circumferentially around the gripping axis "Z" and defines an annular gripping portion, in order to pick up the green tyre from the profiling unit 11 it may be advantageously provided to select an annular gripping band "B" of the green tyre arranged around the geometric axis of rotation "X" at a predetermined height along the geometric axis of rotation itself.

In this case, in order to adjust the gripping device 30, it may be provided to adjust the annular gripping portion to the adjustment diameter and subsequently bring the annular gripping portion in a radially outer position with respect to the annular gripping band "B". The annular gripping portion is arranged at the height of the annular gripping band "B", i.e. in the axial gripping position, for example by means of a relative axial translation movement between the annular gripping portion and the annular gripping band "B" to arrange them at the same height along the geometric axis of rotation "X" of the green tyre (FIG. 9).

The annular gripping band "B" and the relative height are selected as a function of the tyre width. Preferably, the annular gripping band "B" is an annular axial centreline band of the tyre and belongs to the tread band of the tyre.

Once the height of the annular gripping band "B" has been reached, it is provided to adjust the annular gripping portion to the gripping diameter. The gripping diameter coincides with the outer diameter of the annular gripping band "B" optionally in the expanded configuration, so as to activate the annular gripping portion against the annular gripping band.

As described above with reference to the gripping elements 35, the adjustment of the annular gripping portion may be carried out by adjusting simultaneously and synchronously the radial position of all gripping areas or autonomously adjusting the radial position of each gripping area.

The gripping area is thus activated against the radially outer surface 2b of the annular gripping band "B". In particular, the annular gripping portion is placed in contact with the annular gripping band "B" to activate the gripping area against the radially outer surface 2b of the green tyre 2, and in particular to activate the pneumatic suction action.

The pneumatic suction effect produced through the annular gripping portion exerts the above attraction actions "A" directed radially away of the geometric axis of rotation "X" of tyre 2, and distributed along the whole circumferential development of the latter.

As already described above, before moving the green tyre away from the profiling unit 11, it is provided to cancel the thrust action that has brought it to the expanded configuration.

Once the tyre has been separated from the profiling unit 11, during the handling of the gripping device, the green tyre 2 is retained by the gripping device 30 hanging only at the annular gripping band "B".

Thereafter, with reference for example to FIGS. 16-18, the gripping device 30 which carries a second green tyre 2 is centred with respect to the subsequent working station 100, by aligning the gripping axis "Z" and consequently the geometric axis of rotation "X" with a reference axis "K" of the subsequent working station 100 (FIG. 16).

Preferably, it is provided to carry out a relative axial translation movement between the gripping device 30 and the subsequent working station for bringing the axial centreline plane "M" of the green tyre 2 at an axial reference 51 arranged at a predetermined height along the reference axis "K" of the subsequent working station 100 (FIG. 17).

Thereafter, it is provided to release the green tyre 2 in the subsequent working station 100, preferably in a suitable processing position with respect to the subsequent working station (FIG. 18).

According to a possible embodiment, of which the accompanying drawings are a non-limiting example, the gripping device 30 is a loader of a vulcanisation mould 101.

According to a possible embodiment, the vulcanisation mould 101 comprises two half-moulds, of which FIGS. 16-18 show a lower half-mould 102, and a central body 103 preferably movable with respect to the lower half-mould 102. The upper half-mould is not shown. The reference axis "K" of the subsequent working station corresponds to the reference axis of the central body 103 along which the central body itself is movable in translation.

The movement of the gripping device 30 then provides to load the green tyre into the vulcanisation mould 101 for example by releasing the green tyre 2 on the central body 103.

After releasing the green tyre 2 to the subsequent working station 100, in particular to the vulcanisation mould 101, the transfer member 31 repositions the gripping device 30 at the profiling unit 11 on which another tyre to be handled is made available.

The invention claimed is:

1. A method for handling a green tyre for a bicycle, comprising:
arranging the green tyre for the bicycle profiled according to a circular extension around a geometric axis of rotation (X) of the green tyre itself and according to a convex cross-section profile in a radially outer direction, wherein the geometric axis of rotation (X) is arranged in a predefined position, wherein arranging the green tyre comprises exerting a thrust action on a radially inner surface of the green tyre directed radially outwards for expanding the green tyre from the interior up to reaching an expanded configuration;
arranging a gripping device defining a gripping sector distributed around a gripping axis (Z), wherein the gripping sector comprises at least one gripping area for activation on the green tyre;
aligning the gripping axis (Z) with the geometric axis of rotation (X) of the green tyre for coaxially positioning the gripping device around the green tyre;
activating the at least one gripping area against a radially outer surface of the green tyre to retain the green tyre, wherein the at least one gripping area is activated against the radially outer surface of the green tyre arranged in the expanded configuration by an attraction action acting on the radially outer surface of the green tyre moving away from the geometric axis of rotation (X); and handling the gripping device to a subsequent working station of the green tyre while the gripping device continues to retain the green tyre.

2. The method for handling a green tyre for a bicycle as claimed in claim 1, wherein the gripping sector is arranged circumferentially around the gripping axis (Z) and defines an annular gripping portion.

3. The method for handling a green tyre for a bicycle as claimed in claim 2, further comprising selecting an annular gripping band (B) of the green tyre arranged around the geometric axis of rotation (X) at a predetermined height along the geometric axis of rotation itself and activating the at least one gripping area of the annular gripping portion against the radially outer surface of the annular gripping band (B).

4. The method for handling a green tyre for a bicycle as claimed in claim 3, wherein the annular gripping band (B) and the height along the geometric axis of rotation (X) of the green tyre are selected as a function of the tyre width.

5. The method for handling a green tyre for a bicycle as claimed in claim 3, wherein the annular gripping band (B) is an annular axial centreline band of the tyre.

6. The method for handling a green tyre for a bicycle as claimed in claim 3, wherein the annular gripping band (B) belongs to a tread band of the tyre.

7. The method for handling a green tyre for a bicycle as claimed in claim 3, wherein activating the at least one gripping area against the radially outer surface of the green tyre comprises contacting the annular gripping portion with the annular gripping band (B).

8. The method for handling a green tyre for a bicycle as claimed in claim 3, wherein during the handling of the gripping device, the green tyre is retained by the gripping device hanging only at the annular gripping band (B).

9. The method for handling a green tyre for a bicycle as claimed in claim 1, wherein the gripping device comprises a plurality of gripping elements distributed around the gripping axis (Z), wherein each gripping element of the plurality of gripping elements defines a gripping area.

10. The method for handling a green tyre for a bicycle as claimed in claim 9, further comprising adjusting the gripping elements by radially handling them with respect to the gripping axis (Z) of the gripping device for activating or deactivating the gripping areas against the radially outer surface of the green tyre.

11. The method for handling a green tyre for a bicycle as claimed in claim 9, wherein activating the gripping areas against the radially outer surface of the green tyre comprises exerting a pneumatic suction action through the gripping elements that generates a predetermined degree of vacuum between the radially outer surface of the green tyre and the gripping areas.

12. The method for handling a green tyre for a bicycle as claimed in claim 1, further comprising cancelling the thrust action prior to handling the gripping device.

13. The method for handling a green tyre for a bicycle as claimed in claim 1, wherein activating the at least one gripping area against the radially outer surface of the green tyre comprises contacting the at least one gripping area with the radially outer surface of the green tyre.

14. The method for handling a green tyre for a bicycle as claimed in claim 1, wherein the attraction force is exerted by a pneumatic suction action for generating a predetermined degree of vacuum between the radially outer surface of the green tyre and the at least one gripping area.

15. The method for handling a green tyre for a bicycle as claimed in claim 14, further comprising, before handling the gripping device, verifying the predetermined degree of vacuum between the radially outer surface of the green tyre and the at least one gripping area, wherein the predetermined degree of vacuum is the actual gripping of the green tyre.

16. The method for handling a green tyre for a bicycle as claimed in claim 1, wherein the at least one gripping area is activated against the radially outer surface of the green tyre comprising an axial centreline plane (M) of the green tyre.

17. The method for handling a green tyre for a bicycle as claimed in claim 1, wherein the at least one gripping area is activated against the radially outer surface of a tread band of the green tyre.

18. The method for handling a green tyre for a bicycle as claimed in claim 17, wherein during the handling of the gripping device, the green tyre is retained by the gripping device and hangs only at the radially outer surface of the tread band.

19. The method for handling a green tyre for a bicycle as claimed in claim 1, wherein the green tyre is kept with the geometric axis of rotation (X) that is arranged transversely with respect to a horizontal geometric plane.

20. The method for handling a green tyre for a bicycle as claimed in claim 1, wherein the gripping device is handled with the gripping axis (Z) that is arranged transversely with respect to a horizontal geometric plane.

21. The method for handling a green tyre for a bicycle as claimed in claim 1, wherein the green tyre is arranged and positioned in the subsequent working station defining a reference axis (K) arranged transversely with respect to a horizontal geometric plane.

22. The method for handling a green tyre for a bicycle as claimed in claim 1, wherein handling the gripping device comprises loading the green tyre into a vulcanisation mould.

* * * * *